(12) United States Patent (10) Patent No.: US 8,387,717 B2
Kildevaeld (45) Date of Patent: Mar. 5, 2013

(54) MULTI DIRECTIONAL OSCILLATION FROM A ROTATIONAL SOURCE

(76) Inventor: Michael Rogler Kildevaeld, Yarmouthport, MA (US)

( * ) Notice: Subject to any disclaimer, the term of this patent is extended or adjusted under 35 U.S.C. 154(b) by 229 days.

(21) Appl. No.: 12/894,471

(22) Filed: Sep. 30, 2010

(65) Prior Publication Data

US 2011/0011605 A1 Jan. 20, 2011

Related U.S. Application Data

(63) Continuation-in-part of application No. 12/884,104, filed on Sep. 16, 2010, and a continuation-in-part of application No. 12/431,444, filed on Apr. 28, 2009.

(60) Provisional application No. 61/247,523, filed on Sep. 30, 2009, provisional application No. 61/246,112, filed on Sep. 26, 2009, provisional application No. 61/243,146, filed on Sep. 16, 2009, provisional application No. 61/048,417, filed on Apr. 28, 2008.

(51) Int. Cl.
*B27B 9/02* (2006.01)

(52) U.S. Cl. ............ 173/1; 173/29; 173/109; 173/205; 173/216; 30/393

(58) Field of Classification Search ............ 173/29, 173/170, 171, 205, 217, 216, 104, 109, 1; 30/272.1, 392, 393
See application file for complete search history.

(56) References Cited

U.S. PATENT DOCUMENTS

| 3,206,989 | A | * | 9/1965 | Enders | 74/50 |
|---|---|---|---|---|---|
| 3,236,111 | A | * | 2/1966 | Naslund | 74/50 |
| 3,724,237 | A | | 4/1973 | Wood | |
| 3,724,561 | A | * | 4/1973 | Merrels | 173/50 |
| 3,971,132 | A | * | 7/1976 | Griffies et al. | 30/393 |
| 3,978,862 | A | * | 9/1976 | Morrison | 606/178 |
| 4,379,362 | A | * | 4/1983 | Getts | 30/393 |
| 4,385,443 | A | * | 5/1983 | O'Banion | 30/393 |
| 4,628,605 | A | * | 12/1986 | Clowers | 30/393 |
| 5,009,012 | A | * | 4/1991 | Martinez et al. | 30/394 |
| 5,033,552 | A | | 7/1991 | Hu | |
| 5,392,519 | A | * | 2/1995 | Inoue et al. | 30/393 |
| 5,456,011 | A | * | 10/1995 | Inkster | 30/293 |
| 5,555,626 | A | * | 9/1996 | Fuchs | 30/393 |
| 5,755,293 | A | * | 5/1998 | Bourke | 173/29 |
| 5,771,516 | A | | 6/1998 | Huang | |
| 5,993,454 | A | | 11/1999 | Longo | |
| 6,153,838 | A | | 11/2000 | Wadge | |
| 6,170,579 | B1 | | 1/2001 | Wadge | |
| 6,176,322 | B1 | | 1/2001 | Wadge | |
| 6,282,797 | B1 | * | 9/2001 | Osada et al. | 30/392 |
| 6,286,611 | B1 | | 9/2001 | Bone | |
| 6,352,127 | B1 | | 3/2002 | Yorde | |
| 6,553,642 | B2 | | 4/2003 | Driessen | |
| 6,675,911 | B2 | | 1/2004 | Driessen | |
| 6,814,157 | B2 | * | 11/2004 | Maras | 173/171 |
| 7,014,546 | B1 | * | 3/2006 | Birk | 451/355 |
| 7,021,399 | B2 | | 4/2006 | Driessen | |
| 7,077,736 | B2 | | 7/2006 | Uzumcu et al. | |
| 7,188,425 | B2 | * | 3/2007 | Bednar et al. | 30/377 |
| 7,413,025 | B2 | | 8/2008 | Provost | |
| 7,913,345 | B2 | * | 3/2011 | Dayton et al. | 15/28 |

FOREIGN PATENT DOCUMENTS

WO WO2008/057023 5/2008

* cited by examiner

*Primary Examiner* — Scott A. Smith
(74) *Attorney, Agent, or Firm* — GTC Law Group LLP & Affiliates

(57) ABSTRACT

The present invention provides multi-directional oscillation from a rotational source, by receiving a rotational motion, converting the rotational motion to a first oscillating motion, converting the first oscillating motion to a second oscillating motion that is normal to the first oscillating motion and transferring the first oscillating motion and the second oscillating motion to a working element.

4 Claims, 34 Drawing Sheets

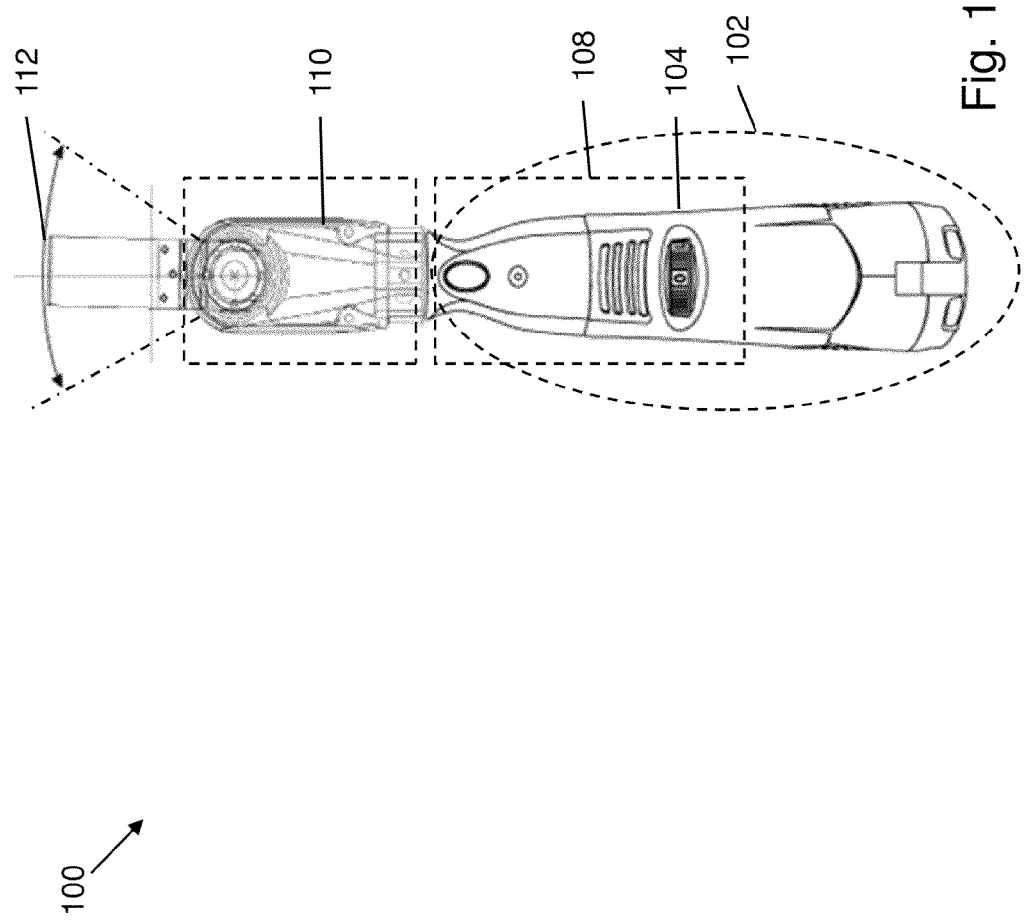

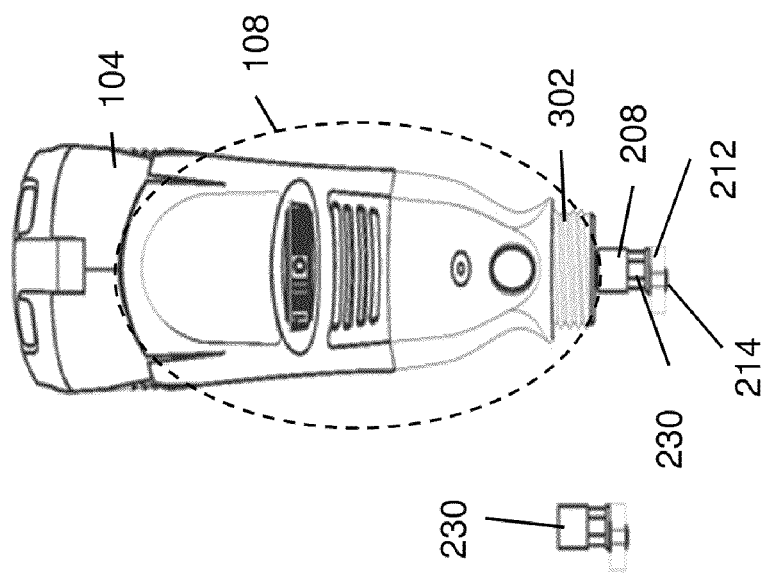
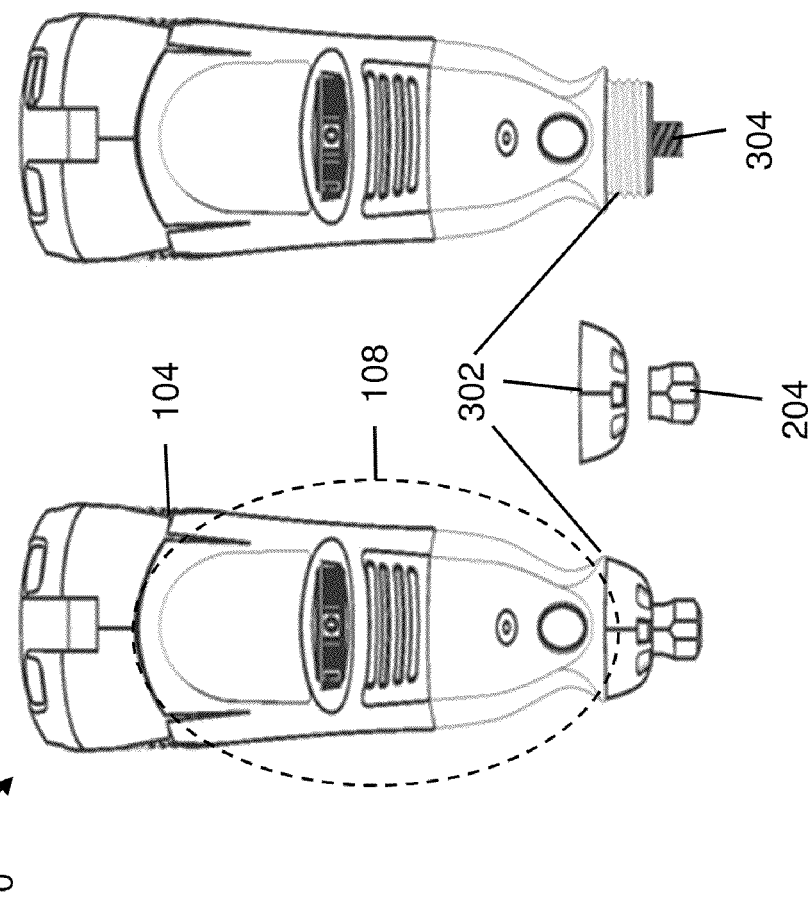
Fig. 3B
Fig. 3A

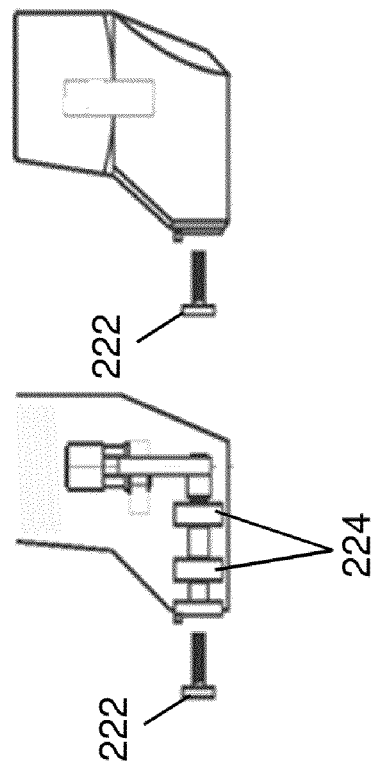
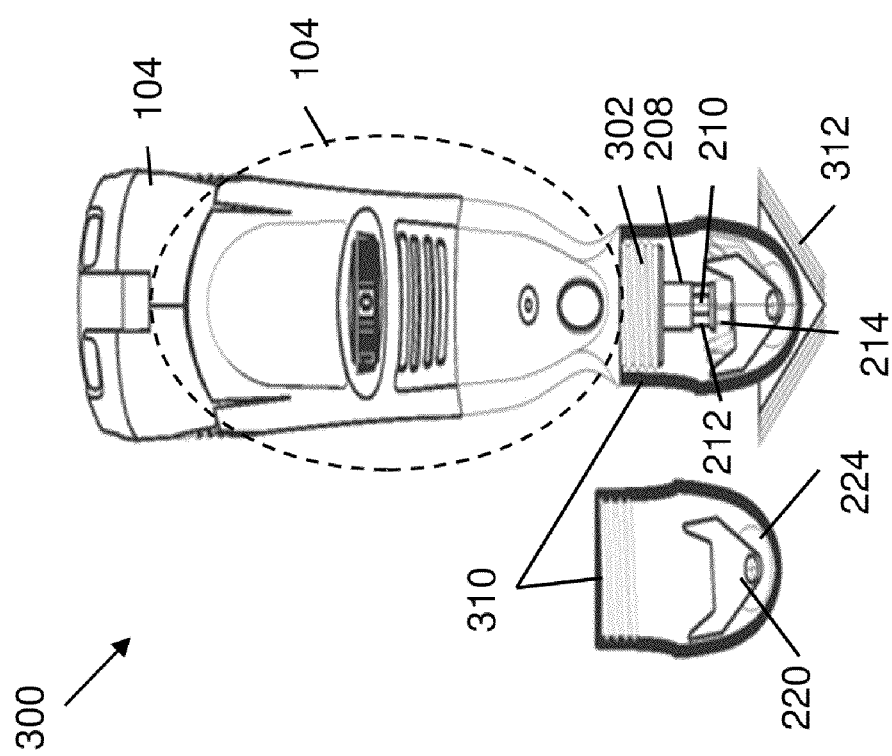
Fig. 3D
Fig. 3C

402

404

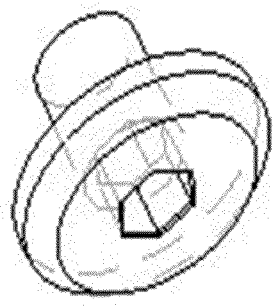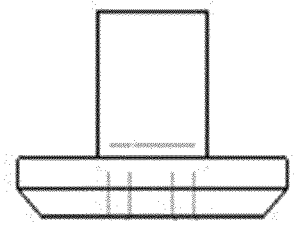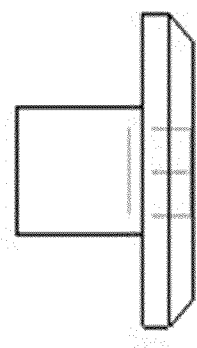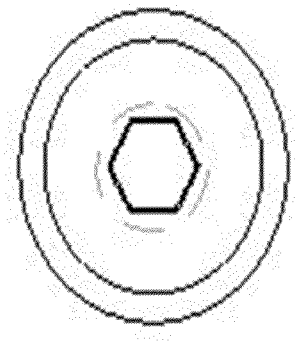
Fig. 7B
Fig. 7D
Fig. 7A
Fig. 7C
408

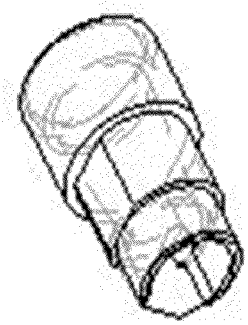
Fig. 8A
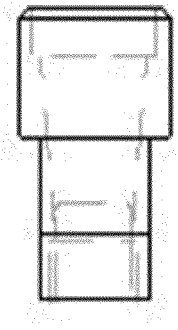
Fig. 8B
Fig. 8C
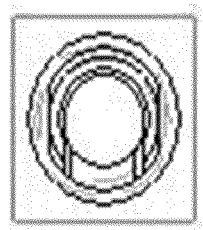
Fig. 8D
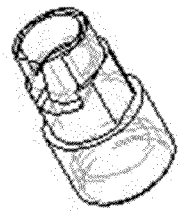
Fig. 8E
410

412

414

418

420

422

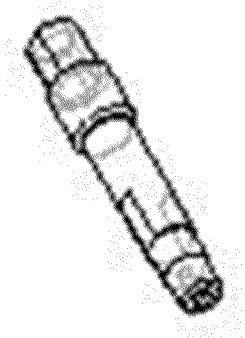
Fig. 14A
Fig. 14B
Fig. 14C
Fig. 14D
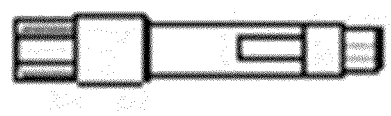
424

1502

430

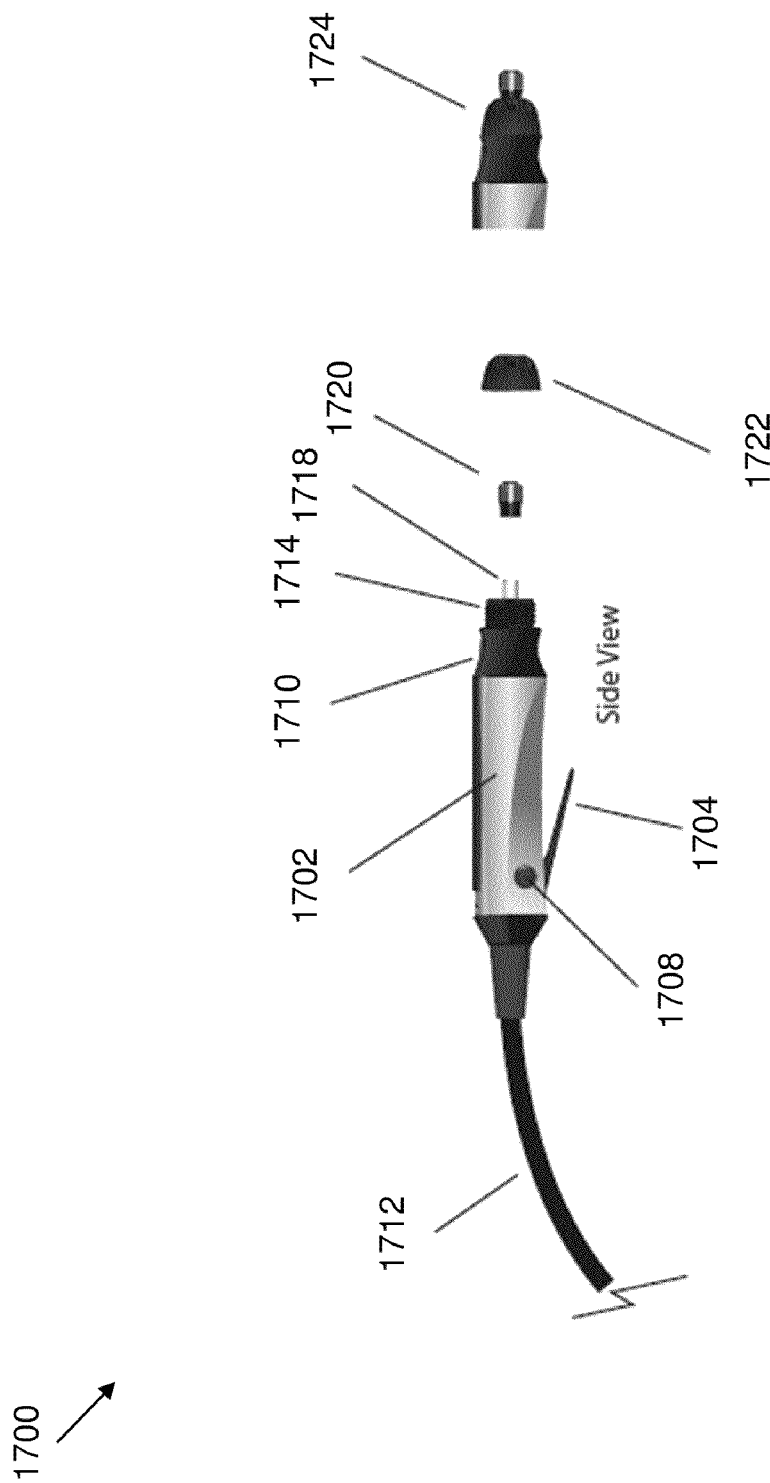

1800

1700

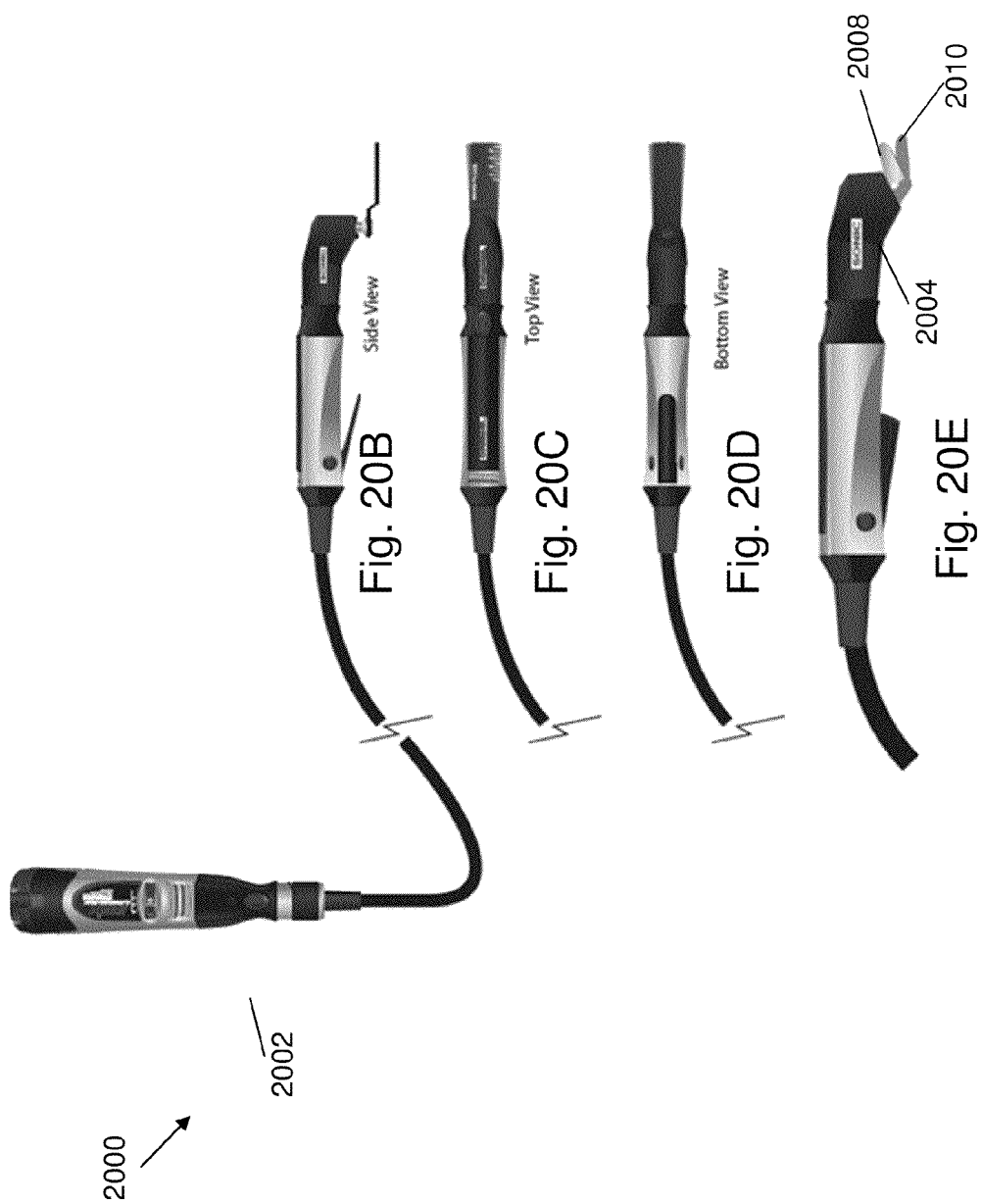

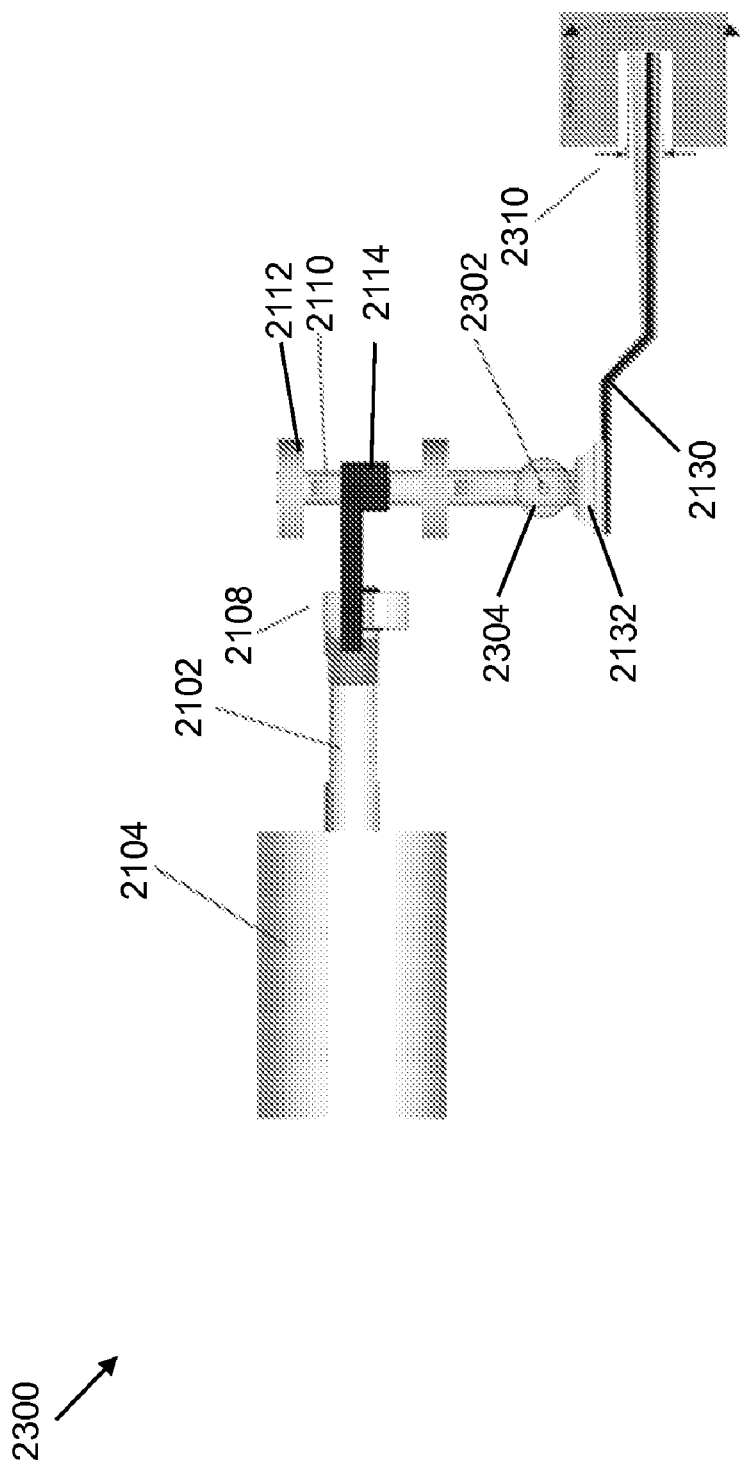

MULTI DIRECTIONAL OSCILLATION FROM A ROTATIONAL SOURCE

CROSS-REFERENCE TO RELATED APPLICATIONS

This application claims the benefit of the following provisional applications, each of which is hereby incorporated by reference in its entirety:

U.S. Ser. No. 61/247,523 filed Sep. 30, 2009.

This application is a continuation-in-part of the following U.S. patent applications, each of pending which is incorporated by reference in its entirety:

Ser. No. 12/884,104 filed Sep. 16, 2010, which claims the benefit of the following U.S. provisional patent applications each of which is incorporated by reference in its entirety U.S. Ser. No. 61/246,112 filed Sep. 26, 2009, and U.S. Ser. No. 61/243,146 filed Sep. 16, 2009; and Ser. No. 12/431,444 filed Apr. 28, 2009 pending which claims the benefit of U.S. provisional application Ser. No. 61/048,417 filed on Apr. 28, 2008 which is incorporated by reference in its entirety.

BACKGROUND

1. Field

The present invention, in general, relates to a mechanical tool for performing machining operations and more specifically to a multi-directional oscillating tool for machining of materials.

2. Description of the Related Art

Power tools such as rotary motor-based tools and compressed air-based tools are used for several machining tasks such as cutting, boring, sanding, carving, drilling, grinding, and the like. Typically, attachments are utilized and fitted on the power tools to facilitate the machining operations of various types. Several types of attachments, including oscillating attachments, are available that may perform machining of the materials by generating an oscillating motion of desired amplitude and frequency.

The existing designs of oscillating attachment-based power tools or simply oscillating tools generate unidirectional movements. Further, the existing designs do not allow sufficient room for the machined material and debris to be removed easily from the portion being machined. This results in a reduction in machining speed of the tools. In certain cases, the tools cease operating and get blocked due to over accumulation of the debris.

Therefore, there is a need for providing multi-directional oscillating tool capabilities with enhanced efficiency that may address the above drawbacks.

SUMMARY

In an aspect of the present invention, a method of multi-directional oscillation from a rotational source may be provided. In accordance with the method, a rotational motion may be received from a rotary tool element that may be a rotary motor via a rotary shaft, a drive shaft of a rotary tool, or a remote handle that is connected to a rotational source through a flexible shaft. The rotational motion may be converted to a first oscillating motion. Further, the first oscillating motion may be converted to a second oscillating motion that may be along a different axis of oscillation from the first oscillating motion. The conversion of the first oscillating motion to the second oscillating motion may be accomplished by moving a working element coupling along a longitudinal axis of a shaft that may transfer the first oscillating motion about its longitudinal axis to the working element coupling. The working element coupling may be moved by an interaction of a first ramp of the working element coupling and a second ramp. The second ramp may be disposed to interact with the first ramp first oscillating motion to cause the second oscillating motion. The method may further facilitate application of at least one of the first oscillating motion and the second oscillating motion to a working element.

In another aspect of the invention, a rotary to multi-oscillating system may be provided. The rotary to multi-oscillating system may include a first oscillating motion system for producing the first oscillating motion from the rotational source. The first oscillating motion system may include an off-centric ball bearing that may receive the rotational motion from the rotational source and a cam that may interact with the off-centric ball bearing to cause the shaft to oscillate about its longitudinal axis. The rotary to multi-oscillating system may also include a second oscillating motion system for producing the second oscillating motion from the first oscillating motion of the shaft. The second oscillating motion system may include a linear bearing with the first ramp. The linear bearing may receive the first oscillating motion from the shaft and may be disposed to move along the shaft. The second oscillating motion system may also include a multi-oscillation generating ramp (second ramp) disposed relative to the first ramp such that the first oscillating motion of the linear bearing may cause the first ramp to interact with the multi-oscillating ramp resulting in the linear bearing to move along the shaft in the second oscillating motion. The rotary to multi-oscillating system may further include a spring disposed within the linear bearing to facilitate it to stably move along the shaft in the second oscillating motion. Furthermore, the rotary to multi-oscillating system may include an actuator for disposing the multi-oscillating ramp in a first position that may prevent interaction with the first ramp thereby disabling the second oscillating motion. In addition, the working element may be attached to the linear bearing for receiving the first oscillating motion and the second oscillating motion. The rotational source may be one of a rotary shaft of a rotary motor or a drive shaft of a rotary tool. The rotational source may alternatively be a remote handle for facilitating remote application of a rotational motion provided to the remote handle through a flexible rotatable shaft that may receive rotational motion from one of a rotary shaft of a rotary motor and a drive shaft of a rotary tool.

A modular and handy tool that may provide both rotary and oscillating motions may also be economical to use. Such a tool may also be useful in any environmental condition. Furthermore, the tool may be easily converted to address a diverse range of tasks and shared by a number of workmen just by changing the attachments (e.g., conversion from a sanding machine to a drilling machine by removing an attachment), thereby mitigating the requirement of several separate tools for completing various machining operations.

Various embodiments of the present invention disclose a modular design of a tool that may provide both rotary and oscillatory motion.

In embodiments, an attachment for a rotary tool, such as a rotary drill, is provided. The attachment may be configured to convert a rotary tool into an oscillating tool.

The attachment may be configured to a plurality of rotary tools, cordless or plug-in, that allows rotary tools (such as a ⅛" or other sized tools) to become either oscillating or vibrating tools.

In embodiments, various additional elements may be added to the attachment facility, such that in operation the rotation of the shaft of the rotary tool creates side-to-side, oscillating movement at high speed. The oscillating attachment may be configured with additional attachment elements to allow various oscillating actions on a work piece, such as sawing, sanding, or the like, with great precision.

In an aspect of the invention, methods and systems for converting a rotational tool to an oscillating tool include a removable attachment for a rotary power tool that attaches to the rotating drive shaft of the rotary power tool and converts the rotating motion of the drive shaft to an oscillating motion and wherein the removable attachment is configured to hold an oscillating working element. In the aspect, the oscillating working element is selected from the group consisting of a cutting element and a sanding element. In the aspect, the methods and systems may further be configured with a universal threaded aftermarket device mounting screw.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE DRAWINGS

FIG. 1 depicts a rotary-oscillating tool, in accordance with various embodiments of the present invention;

FIG. 3A, FIG. 3B, FIG. 3C and FIG. 3D depict different views of the rotary-oscillating tool, in accordance with various embodiments of the present invention;

FIG. 7A, FIG. 7B, FIG. 7C and FIG. 7D depict different views pertaining to blade screws, in accordance with various embodiments of the present invention;

FIG. 8A, FIG. 8B, FIG. 8C, FIG. 8D, and FIG. 8E depict different views pertaining to an aluminum casing, in accordance with various embodiments of the present invention;

FIG. 14A, FIG. 14B, FIG. 14C, and FIG. 14D depict different views pertaining to the vertical shaft, in accordance with various embodiments of the present invention;

FIG. 17A, FIG. 17B, and FIG. 17C depict different views of a straight handle for use with the rotary-oscillating tool, in accordance with an embodiment of the present invention.

FIG. 20B, FIG. 20C, FIG. 20D, and FIG. 20E depict various views of the rotary-oscillating tool with attachments powered by the rotary motor, in accordance with various embodiment of the present invention.

FIG. 23 depicts a side view of a system for providing a rotary-oscillating tool or adapter with multi-directional oscillating capability, in accordance with another embodiment of the present invention.

DETAILED DESCRIPTION

Figure 2C:
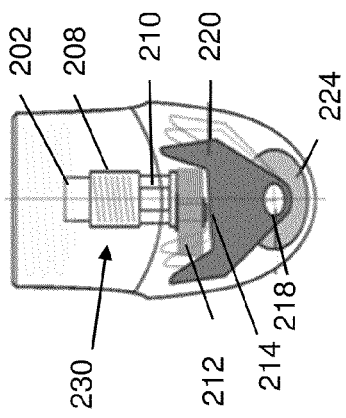
FIG. 2A, FIG. 2B, FIG. 2C, and FIG. 2D depict different structural components associated with an attachment facility, in accordance with various embodiments of the present invention.

While the specification concludes with the claims defining the features of the invention that are regarded as novel, it is believed that the invention will be better understood from a consideration of the following descriptions in conjunction with the drawings/figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

Various embodiments of the present invention may provide a rotary to oscillatory tool 100 (hereinafter rotary-oscillating tool 100) capable of providing rotary and oscillatory motions during machining operations. In FIG. 1, an exemplary rotary-oscillating tool 100 is shown. The rotary-oscillating tool 100 may include a rotary tool 102 equipped with different components such as an electric motor, thread stem, rotatable chunk, rotating drive shaft, and other components. As shown in FIG. 1, examples of these different components may include a handle 104, a motor facility 108, and the like.

The rotary-oscillating tool 100 may also include a removable attachment facility 110 and oscillating working elements 112. The removable attachment facility 110 may enable a rotary tool 102 to perform as an oscillating or vibrating tool, depending on the requirement. For example, the removable attachment facility 110 may enable the oscillating working elements 112 of a rotating drill to oscillate or vibrate.

In an exemplary scenario, a workman may require a drill machine with blades that may rotate to perform various operations on a work-piece which may include but may not be limited to drilling, cutting, shaping, and the like. For example, consider a rotary tool 102 that may be a drill machine having a drill bit for drilling holes in various materials. The workman may require a drill machine that may be easily converted to perform oscillatory or vibratory motion for operations such as cutting, carving, sawing, chiseling, filing, sanding, engraving, and the like. This may be achieved by using the removable attachment facility 110. The worker may not require any separate vibratory or oscillatory machine. In fact, the rotary-oscillating tool 100 of the present invention may provide the rotary as well as the oscillatory motion to the attached oscillating working elements 112. For example, when the removable attachment facility 110 is removed, the rotary-oscillating tool 100 may have the capability to perform rotary operations on the work-piece. In addition, the rotary-oscillating tool 100 may perform the oscillatory operations on the work-piece when the removable attachment facility 110 is attached.

In an aspect of the present invention, the removable attachment facility 110 may enable oscillating movement of the tool at high speeds. As a non-limiting example, if an independent rotary tool drive shaft rotates at 35,000 RPM, then the attachment facility 110 may facilitate 70,000 sideways oscillations per minute.

In embodiments, the oscillating removable attachment facility 110 may be configured with additional attachment elements to allow various oscillating actions on the work-piece, such as sawing, sanding, carving, chiseling, filing, engraving, and the like, with great precision. In embodiments, the removable attachment facility 110 may provide horizontal oscillations to oscillating working elements 112 of the rotary-oscillating tool 100. In other embodiments, the removable attachment facility 110 may provide vertical oscillations to the oscillating working elements 112 of the rotary-oscillating tool 100.

It may be noted that the removable attachment facility 110 has been explained in conjunction with an exemplary tool. However, those skilled in the art would appreciate that the removable attachment facility 110 may be used in conjunction with similar other tools and devices that may be used for different operations and purposes. It may also be noted that the rotary-oscillating tool 100 may be equipped with oscillating working elements 112. However, those skilled in the art may also appreciate that the oscillating working elements 112 may be of various types such as diamond blades, band saw, resaw, head saw, chain saw blades, and the like. For example, the blades may have angular teeth with varying pitches or indents.

FIG. 2A, FIG. 2B, FIG. 2C, and FIG. 2D depict the various structural components associated with an embodiment of the removable attachment facility 110 that includes an offset cam bearing facility 230 for converting rotary movement to oscillating movement.

Figure 2D:
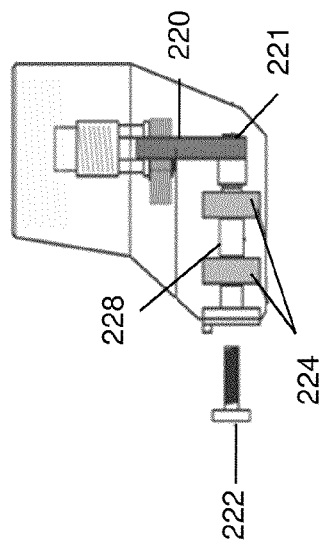
Figure 2A:
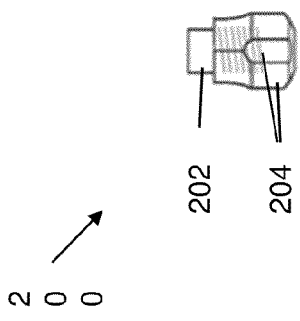

FIG. 2A shows a chuck element 204 normally attached to a rotary tool by a thread mechanism 202. In embodiments, an adjustable jaw may centre a work piece in a tool such as positioning a drilling bit at the center of the chuck 204 for drilling a hole. This chuck 204 may be removed by twisting off counter-clockwise or opposite of the normal direction of rotation of the rotary tool drive shaft. In embodiments, the chuck 204 may be removed by using a small wrench (not shown in the figure). To facilitate converting rotation of a drive shaft to oscillation, chuck 204 may be replaced by a vibration attachment chuck 208, which is explained below.

Figure 2B:
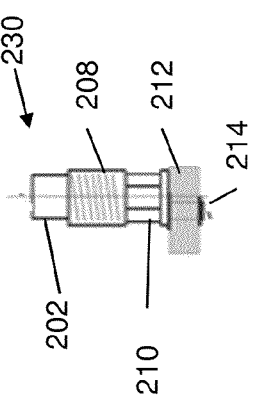
Figure 4A:
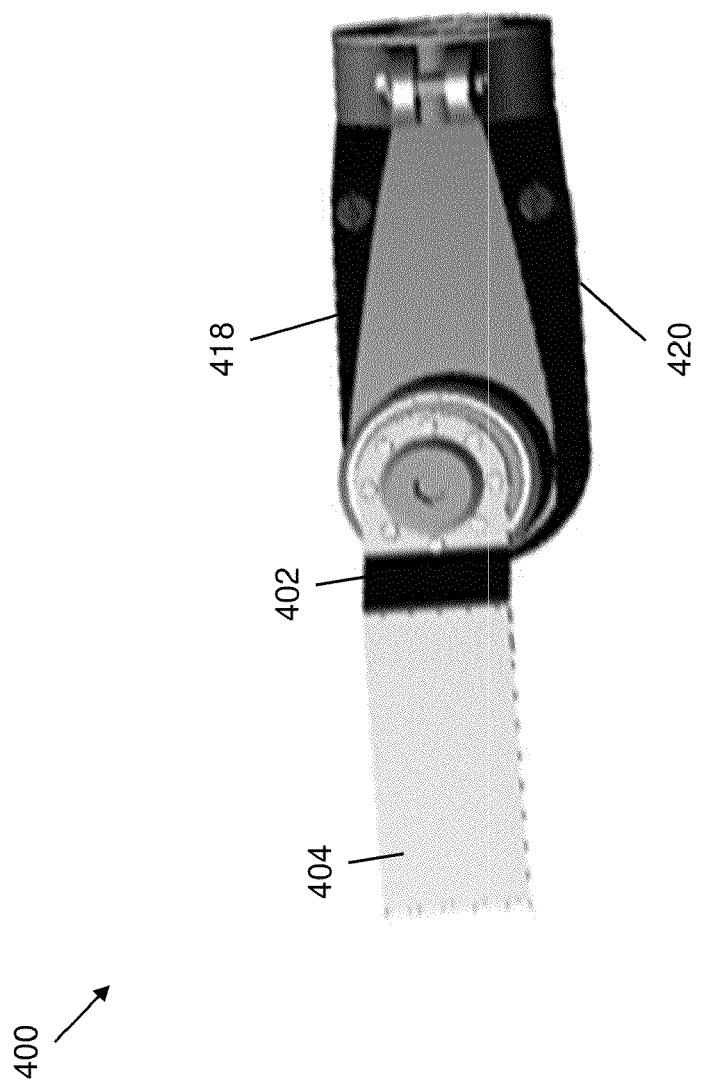
FIG. 4A, FIG. 4B, FIG. 4C, FIG. 4D, and FIG. 4E depicts different prospective views of the rotary-oscillating tool, in accordance with various embodiments of the present invention.
Figure 4B:
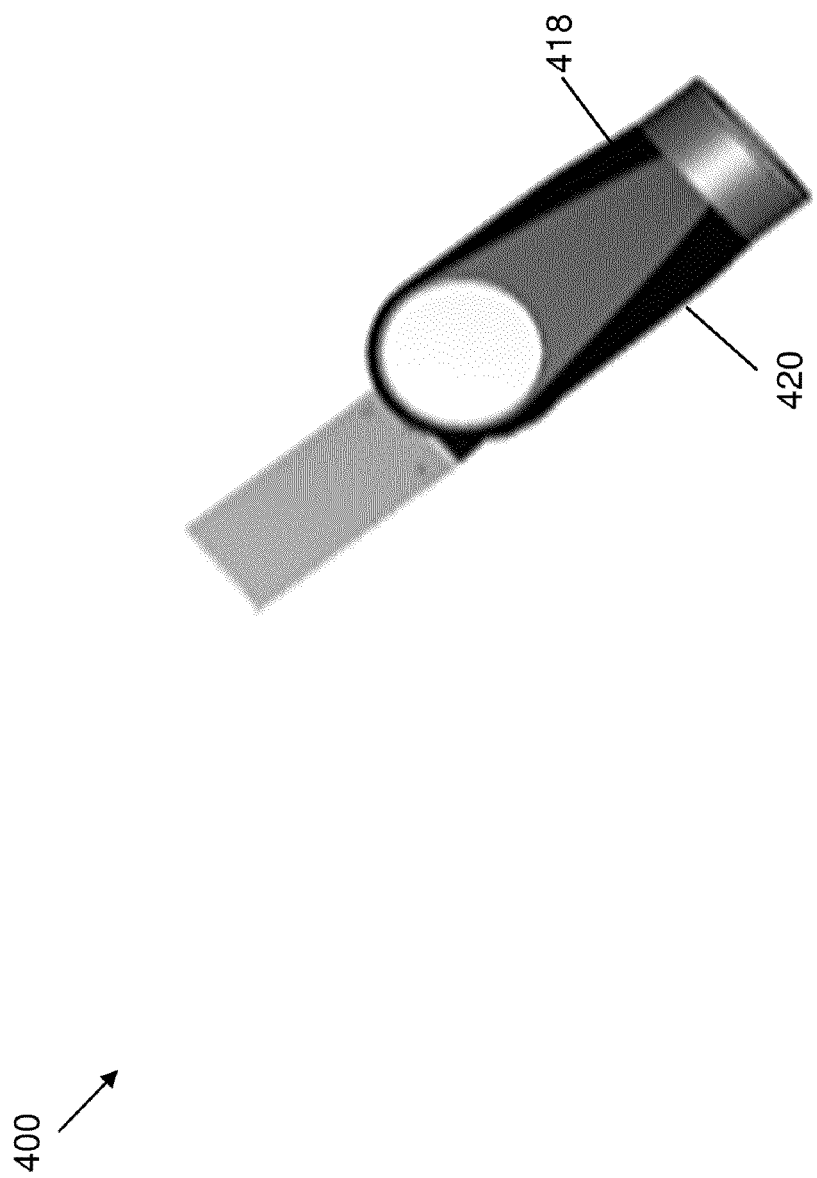
Figure 4C:
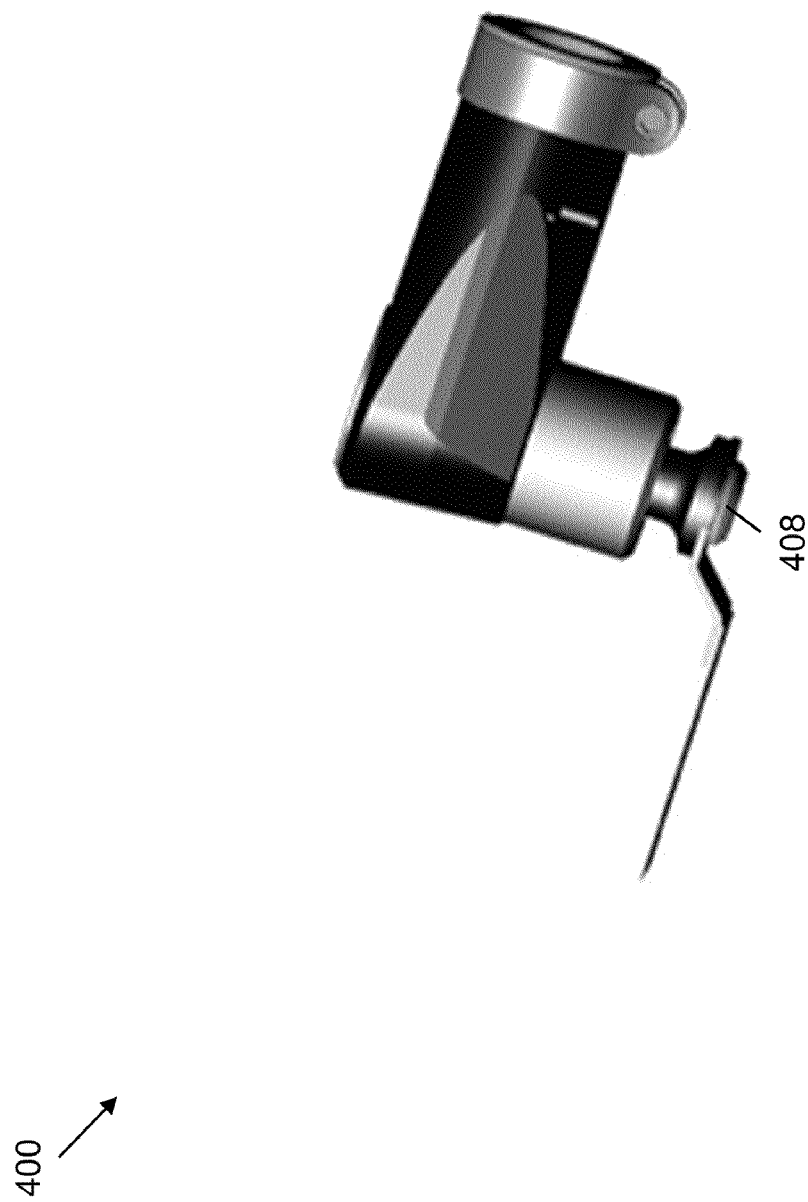
Figure 4D:
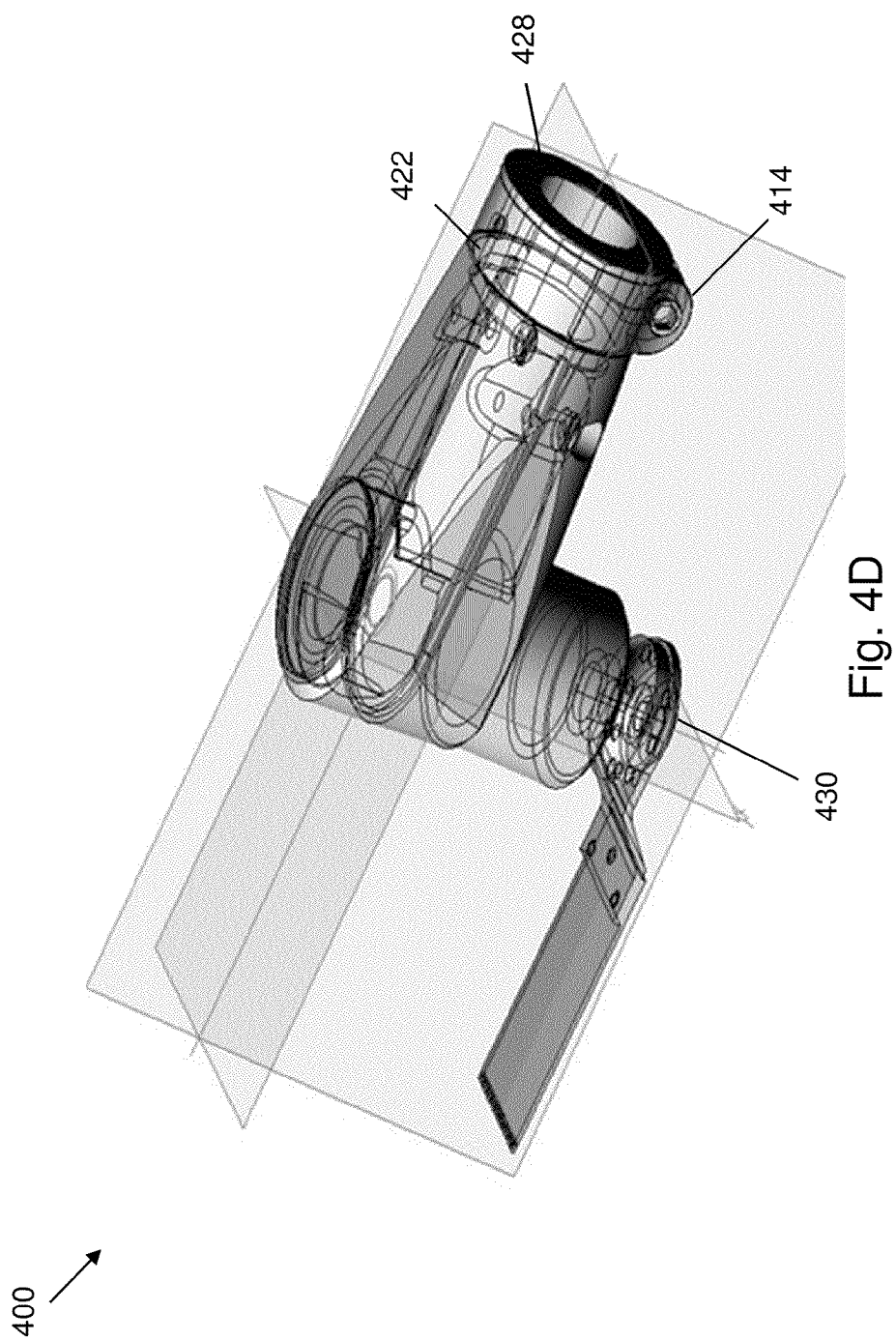
Figure 4E:
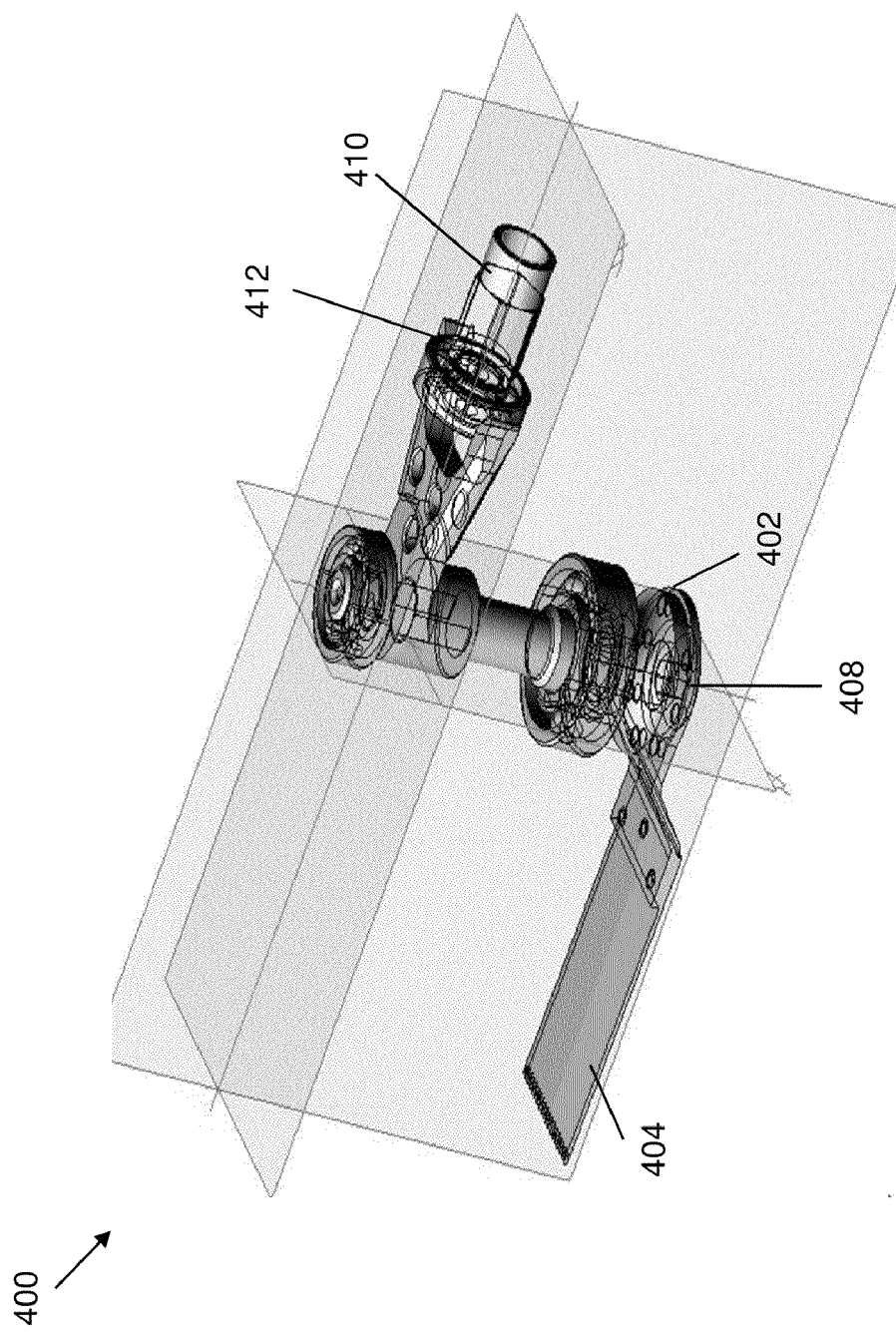
Figure 5A:
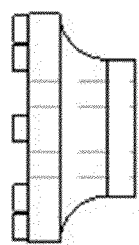
FIG. 5A, FIG. 5B, FIG. 5C, and FIG. 5D depict different views pertaining to blade mounts, in accordance with various embodiments of the present invention.
Figure 5B:
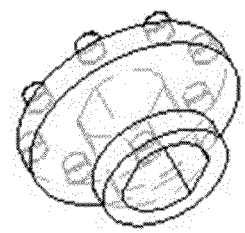
Figure 5C:
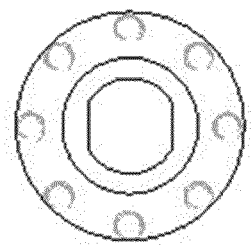
Figure 5D:
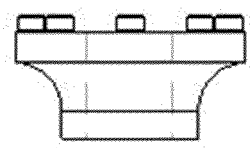
Figure 6B:
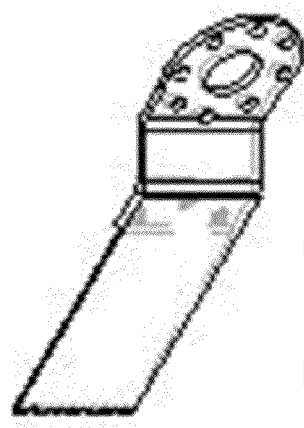
FIG. 6A, FIG. 6B, FIG. 6C, and FIG. 6D depict different views pertaining to saw blades, in accordance with various embodiments of the present invention.
Figure 6D:
Figure 6A:
Figure 6C:
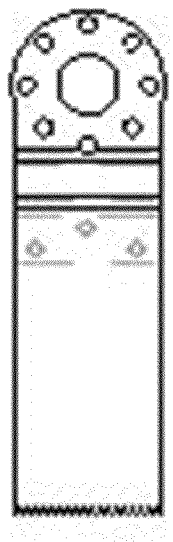
Figure 9B:
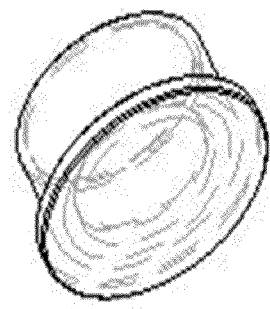
FIG. 9A, FIG. 9B, FIG. 9C, and FIG. 9D depict different views pertaining to the aluminum cap, in accordance with various embodiments of the present invention.
Figure 9D:
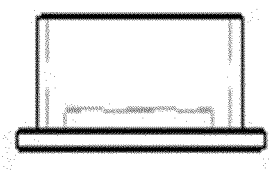
Figure 9A:
Figure 9C:
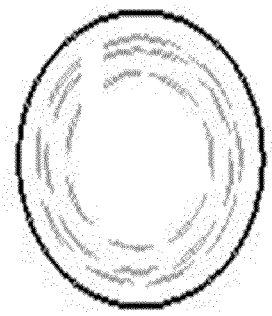
Figure 10C:
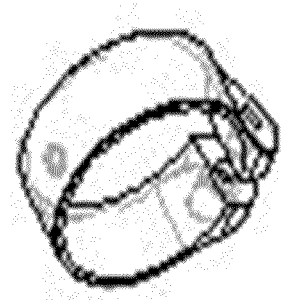
FIG. 10A, FIG. 10B, FIG. 10C, and FIG. 10D depict different views pertaining to motor clamp, in accordance with various embodiments of the present invention.
Figure 10B:
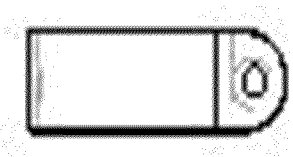
Figure 10D:
Figure 10A:
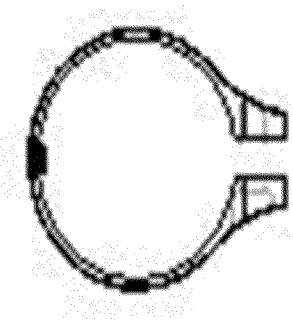
Figure 11A:
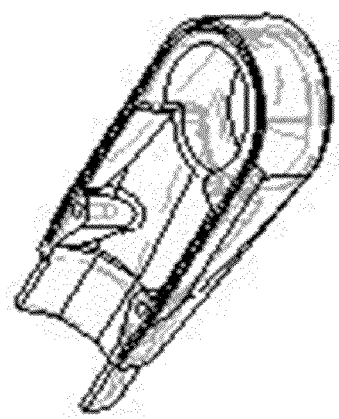
FIG. 11A, FIG. 11B, FIG. 11C, and FIG. 11D depict different views pertaining to the plastic top shell, in accordance with various embodiments of the present invention.
Figure 11B:
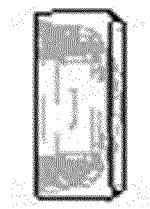
Figure 11C:
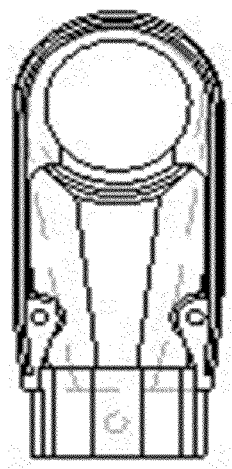
Figure 11D:
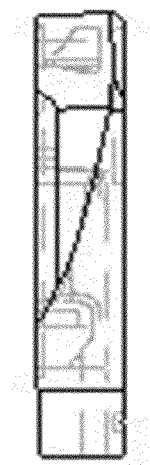
Figure 12B:
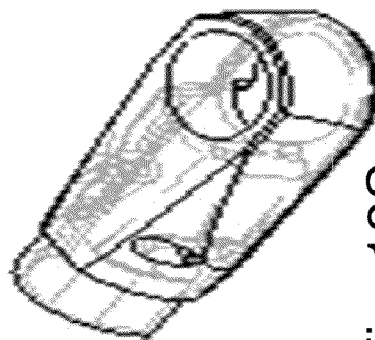
FIG. 12A, FIG. 12B, FIG. 12C, FIG. 12D and FIG. 12E depict different views pertaining to the plastic bottom shell, in accordance with various embodiments of the present invention.
Figure 12C:
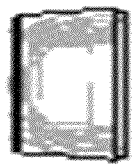
Figure 12A:
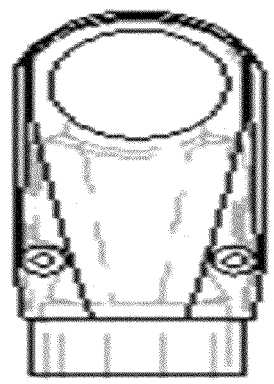
Figure 12D:
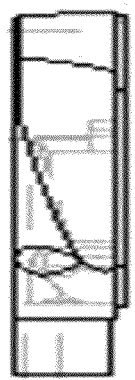
Figure 12E:
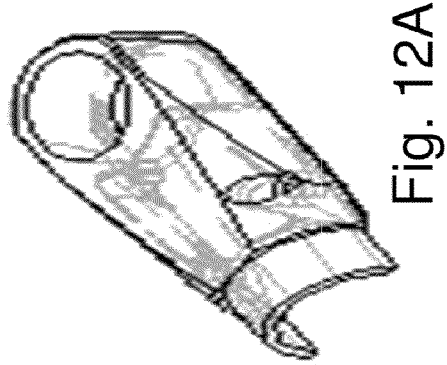
Figure 13B:
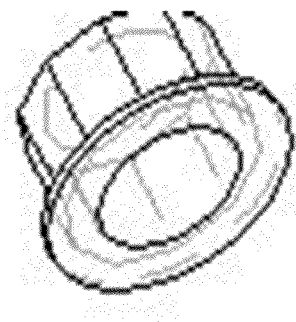
FIG. 13A, FIG. 13B, FIG. 13C, and FIG. 13D depict different views pertaining to motor mount, in accordance with various embodiments of the present invention.
Figure 13D:
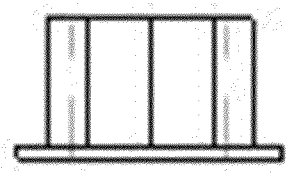
Figure 13A:
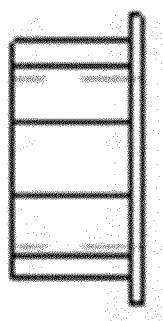
Figure 13C:
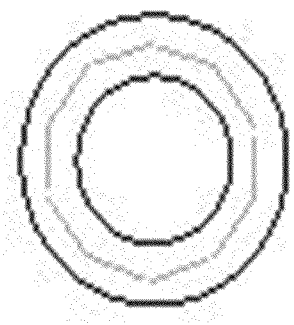
Figure 15B:
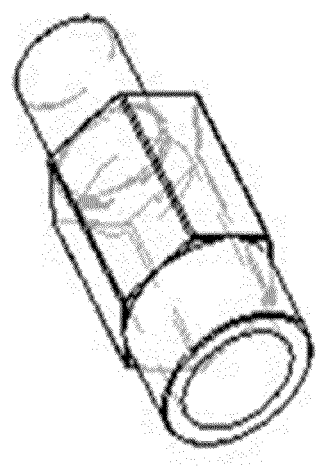
FIG. 15A, FIG. 15B, FIG. 15C, and FIG. 15D, depict different views pertaining to the motor shaft, in accordance with various embodiments of the present invention.
Figure 15D:
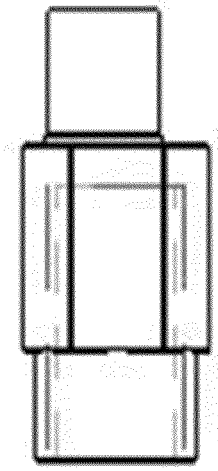
Figure 15A:
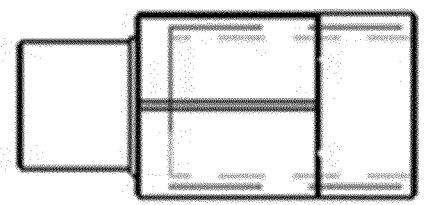
Figure 15C:
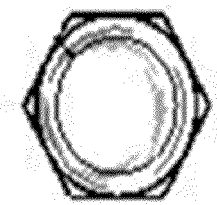
Figure 16A:
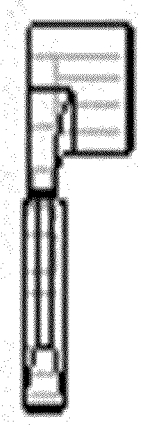
FIG. 16A, FIG. 16B, FIG. 16C, and FIG. 16D depict different views pertaining to the swing arm, in accordance with various embodiments of the present invention.
Figure 16B:
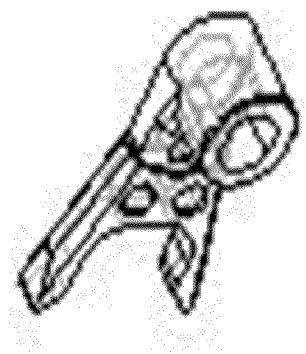
Figure 16C:
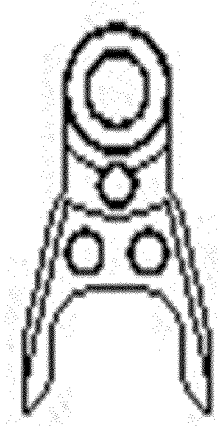
Figure 16D:
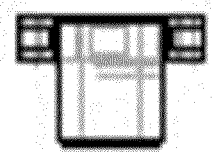

As shown in FIG. 2B the removable attachment facility 110 may include an offset cam bearing facility 230 that attaches to the rotary tool in place of the chuck element 204, and may also include a vibration attachment chuck 208 with an internally threaded stem 202, which may be associated with a threaded drive shaft of a rotary tool that would normally hold the chuck element 204. An offset cam element 212 may include two ends, one of which extends further in one direction from the central axis of the offset cam bearing facility 230 than does the other end, and may provide an offset extent of rotation upon rotation of the vibration attachment chuck 208 that receives rotation from the drive shaft of a rotary tool 102. The offset bearing element 212 projects from a side of the central axis of the offset cam bearing facility 230 and transits a circle around the center of the drive shaft. The removable attachment facility 110 may also include a wrench style portion 210, and an offset post 214. The wrench style portion 210 may be used for tightening the vibration attachment chuck 208. The offset bearing element 212, optionally a ball bearing, may be attached to the vibration attachment chuck 208 through the wrench style portion 210 and may allow vibrations such as very rapid vibrations. The offset post 214 may be connected to the offset bearing 212 and may enable a cam like motion to initiate sonic vibrations. For example, the offset bearing 212 may be disk shaped and may convert the circular motion of the drive shaft into a substantially linear motion of the offset post 214.

The offset post 214 may be positioned offset from the main axis of the bearing facility 230, such that the post 214 itself transits a circle about the main axis upon rotation of the drive shaft. The offset nature of the post 214 through the bearing element 212 tends to produce a substantially linear oscillating motion of each of them upon rotation of the rotary tool drive shaft.

Various mechanisms may be used to interact with the offset bearing element 212 or the post 214, or both, in order to produce oscillating motion of a working element, such as an aftermarket attachment. In FIG. 2C a rocking element 220, also referred hereinto as a swing arm is depicted, positioned to interact with the offset bearing element 212, such that upon rotation of the offset bearing element 212, the sides of the rocking element 220 are alternatively impacted by the offset bearing element 212, causing the rocking element 220 to rock, or oscillate. The rocking element 220 may rock about a pivot point 218 that may be supported by a stabilizing bearing 224 that limits or cushions the extent of movement of the rocking element 220. The rocking element 220 may be contained in a housing.

In an alternative embodiment shown in FIG. 2D it can be seen that in one embodiment a working attachment facility may be connected to the offset cam bearing facility 230 by attaching to the post 214, such as by inserting a rod 221 onto the post 214. In alternative embodiments, the post 214 might be replaced with a channel, into which a pin or rod could be inserted. Upon movement of the offset bearing element 212 upon rotation of the offset cam bearing facility 230, the rod 221 oscillates sideways, imparting oscillating motion to a working portion of the attachment facility, including elements 224 and 228. An attachment element, such as a bit attachment screw 222 may connect a working element, such as blade, to the attachment facility 110, in which case upon rotation of the bearing facility 230, the working element oscillates.

In embodiments, various types of rocking elements 220 may be configured with the offset cam 212 to provide vibratory or oscillatory motion. For example, as shown in FIG. 2C the rocking element 220 may alter the direction of the power by 90 degrees, thereby producing vibrations. It may be noted that different rocking elements 220 may be configured with the removable attachment facility 110. Referring to FIG. 2D, the rocking element 220 may be coupled with rod 221 that may change the direction of the power by 90 degrees. The rod 221 may transit the torque to the bit attachment screw 222 through a plurality of stabilizing bearings 224. Vibrations generated by change of direction may be stabilized through a plurality of stabilizing bearings 224. It may be noted that in addition to the above stated components, the removable attachment facility 110 may also include other components which may help in performing operations on the work piece. For example, the removable attachment facility 110 may also include the rocking element 220 for the offset cam/ball bearing 212, a post 214 for sonic vibrations, a bit attachment screw 222, stabilizing bearings 224 for the post 214, and a pin 228 that may oscillate back and forth for causing vibrations.

In embodiments, the aftermarket attachments may be made up of aluminum, steel, iron, zinc, copper, and the like.

In embodiments, in addition to side to side oscillations, the oscillating working elements 112 may be configured to move up and down. For example, the blade may oscillate up and down about 0.0125 inches total (up 0.00625 inches and down 0.00625 inches) from a neural position. This extra up and down motion may allow the oscillating working elements 112 to clear the sawdust or other debris from a work piece and may keep the oscillating working elements working well. Such an up and down movement may be facilitated by the removable attachment facility 110 as described herein, or by providing such motion in a conventional oscillating tool.

All of these components may be referred to as aftermarket installations, as these components may be changed as per the operational requirements.

In embodiments, referring to FIG. 3A, FIG. 3B, FIG. 3C, and FIG. 3D, different views pertaining to the conversion of rotary tool 102 to rotary-oscillating tool 100 by using the removable attachment facility 110 may be provided. As shown in FIG. 3A, the conventional chuck 302 may be removed and the threaded stem 304 along with the universal threaded aftermarket device mounting screw 302 may be exposed.

In FIG. 3B, the chuck 302 may be replaced in part by the offset cam bearing facility 230, with an offset bearing element 212 and post 214 as described above in connection with FIGS. 2B, 2C and 2D. The offset cam bearing facility 230 may be screwed onto the thread of the rotary tool 102. Upon rotation of the shaft of the rotary tool, the offset bearing element 212 and post 214 transit the circumference of a circle as the offset cam bearing facility 230 rotates with the rotation of the rotary tool.

As shown in FIG. 3C, an alternate chuck 310 may be provided, configured to interoperate with the offset bearing element 212 and post 214 of the removable attachment facility 110. The alternate chuck 310 includes the rocking element 220 which rocks from side to side as the offset bearing element 212 and post 214 transit the circumference of a circle upon rotation of the rotary tool, the bearing element 212 and post 214 alternately impacting one side or the other of the rocking element 220, such that the rocking element rocks back and forth, or oscillates, in response to the current location of the offset bearing element 212 and post 214. The side-to-side rocking of the rocking element 220 thus provides oscillation back and forth (two oscillations) upon each rotation of the drive shaft of the rotary tool. The alternate chuck 310 may be adapted to screw onto the thread 302 used for attaching aftermarket installations to the rotary tool. Upon so attaching the alternate chuck 310 to the thread 302, the rocking element 220 is positioned to interact with the offset cam bearing element 212 and post 214 to provide the oscillation described above. The alternate chuck 310 may be configured to accept various forms of aftermarket working elements, including blades, sanding elements, and the like, as described herein.

As shown in FIG. 3D, in another embodiment a blade or working element may be attached to the rotary tool 102, with oscillation provided as described in connection with FIG. 2D. Thus, the rotary tool may now operate as an oscillatory tool and it may be referred to as the rotary-oscillating tool 100. In the above embodiments, the removable attachment facility 110 may provide vibratory or the oscillatory motion to the oscillating working elements 112 or other aftermarket attachments.

In embodiments, different views of the rotary-oscillating tool 100 may be shown in FIG. 4A, FIG. 4B, FIG. 4C, FIG. 4D, and FIG. 4E. FIG. 4A, FIG. 4B, FIG. 4C, FIG. 4D, and FIG. 4E and may be shown to have blade mountings 402, saw blade attachment 404, blade screw 408, aluminum casing 410, aluminum cap 412, motor clamp 414, plastic top shell 418, plastic bottom shell 420, motor attachment 422, vertical shaft 424, motor shaft housing 428, swing arm attachment 430, and the like. The description and different views corresponding to each of the above stated components may be provided below.

In embodiments, referring to FIG. 5A, FIG. 5B, FIG. 5C, and FIG. 5D, different views pertaining to blade mounts 402 may be shown. The blade mounts 402 may secure blades 404 to the removable attachment facility 110, by using 8 small pins around the blades 404. The blade mount 402 may be positioned to 0, 45, 90, 135, 180, 225, 270, degrees so that every 45 degrees in a full rotation may allow blades 404 to be mounted upside down.

In embodiments, referring to FIG. 6A, FIG. 6B, FIG. 6C, and FIG. 6D, different views pertaining to saw blades 404 may be provided. The saw blades 404 may be attached to the removable attachment facility 110 and may rotate back and forth along the vertical shaft 424 1.5 degrees each side (left and right) to provide the oscillating cut, sand, removal action, and the like.

In embodiments, referring to FIG. 7A, FIG. 7B, FIG. 7C, and FIG. 7D, different views pertaining to blade screws 408 may be provided. The blade screws 408 may fasten the blade 404 to blade mount 402. The blade screws 408 may have a wide head which may enable it to come close to the 8 small pins holding the blade position.

In embodiments, referring to FIG. 8A, FIG. 8B, FIG. 8C, and FIG. 8D, and FIG. 8E, different views pertaining to an aluminum casing 410 may be provided. The aluminum casing 410 may stabilize the vertical shaft 424 by holding/securing the top and bottom ball bearings 212.

In embodiments, referring to FIG. 9A, FIG. 9B, FIG. 9C, and FIG. 9D, different views pertaining to the aluminum cap 412 may be provided. The aluminum cap 412 may be a part of the aluminum casing 410. This cap 412 may stabilize top vertical shaft ball bearing by enclosing the top of the aluminum casing 410.

In embodiments, referring to FIG. 10A, FIG. 10B, FIG. 10C, and FIG. 10D, different views pertaining to motor clamp 414 may be provided. The motor clamp 414 may secure the casing to the motor mount 422. The plastic top and bottom casing may have a slice in the casing to allow the plastic to contract when the motor clamp 414 is tightened over the plastic casing.

In embodiments, referring to FIG. 11A, FIG. 11B, FIG. 11C, and FIG. 11D, different views pertaining to the plastic top shell 418 may be provided. The plastic top shell 418 may be a part of the plastic casing and may provide torsion strength to casing by placing seam horizontal with an integrated seam to enclose top and bottom casing. The plastic top shell 418 may also attach to motor mount with an octagon joint to position head of the attachment in most positions firmly without spinning. The plastic casing may have a radius wall which may inclosing/stabilizing the aluminum casing 410.

In embodiments, referring to FIG. 12A, FIG. 12B, FIG. 12C, and FIG. 12D, different views pertaining to the plastic bottom shell 420 may be provided. The plastic bottom shell 420 may be a part of the plastic casing and may provide torsion strength to casing by placing seam horizontal with an integrated seam to enclose top and bottom casing. The plastic bottom shell 420 may also attach to motor mount 422 with an octagon joint to position head of the attachment in most positions firmly without spinning. The plastic casing may have a radius wall which may inclosing/stabilizing the aluminum casing 410.

In embodiments, referring to FIG. 13A, FIG. 13B, FIG. 13C, and FIG. 13D, different views pertaining to motor mount 422 may be provided.

In embodiments, referring to FIG. 14A, FIG. 14B, FIG. 14C, and FIG. 14D, different views pertaining to the vertical shaft 424 may be provided. The vertical shaft 424 may oscillate 3 degrees, may hold the rocking element or swing arm 430 and the motor mount 422 may be aligned to each other. A top and bottom ball bearing may allow the vertical shaft 424 to rotate 1.5 degrees left and 1.5 degrees.

In embodiments, referring to FIG. 15A, FIG. 15B, FIG. 15C, and FIG. 15D, different views pertaining to the alternate embodiments of a vibration attachment chuck 1502 may be provided. The chuck 1502 may transfer a rotary tool rotational action to the removable attachment facility 110. The end of the chuck 1502 that mounts to the rotary tool drive shaft may be threaded.

In embodiments, referring to FIG. 16A, FIG. 16B, FIG. 16C, and FIG. 16D, different views pertaining to the swing arm 430 may be provided. The swing arm 430 may attach to the vertical shaft 424. The swing arm 430 may follow the oscillating motion described above for the rocking element 220. The swing arm 430 may swing back and forth 1.5 degrees in each direction.

Figure 17B:
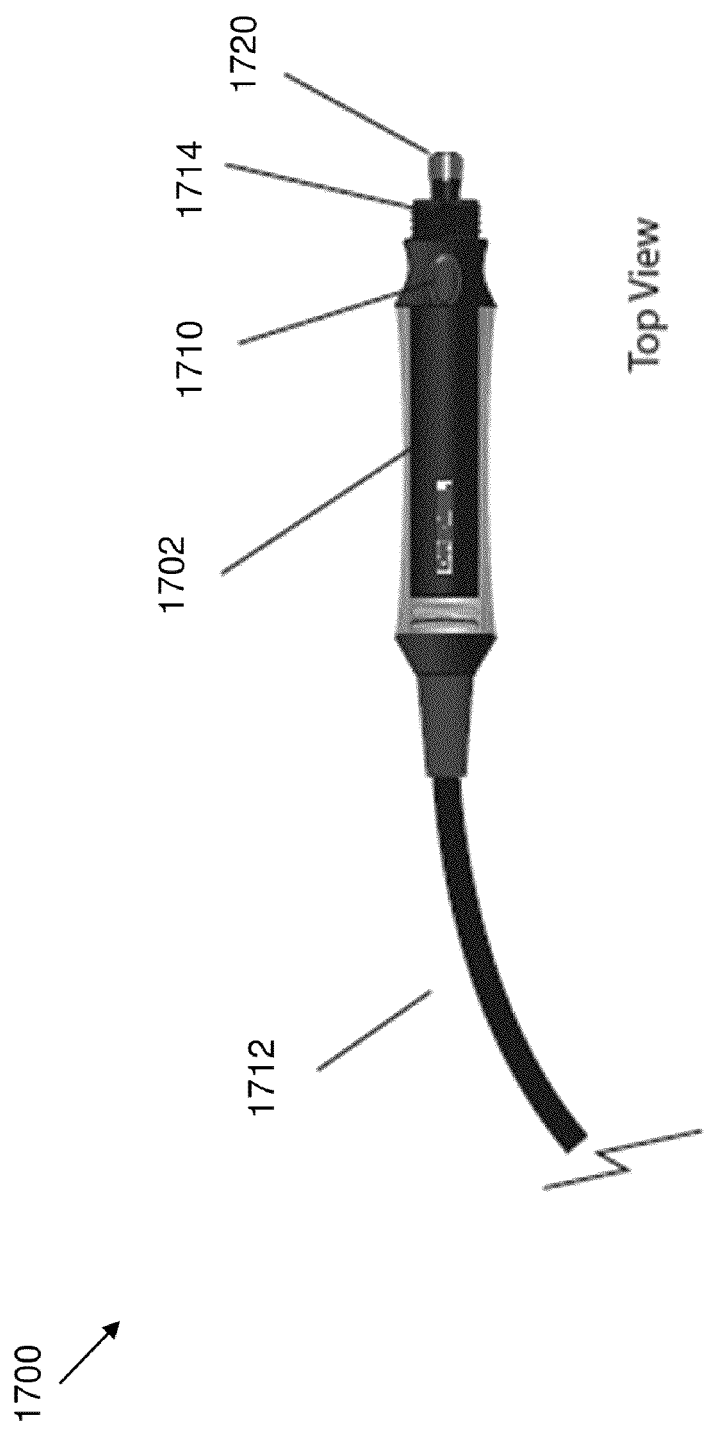
Figure 17C:
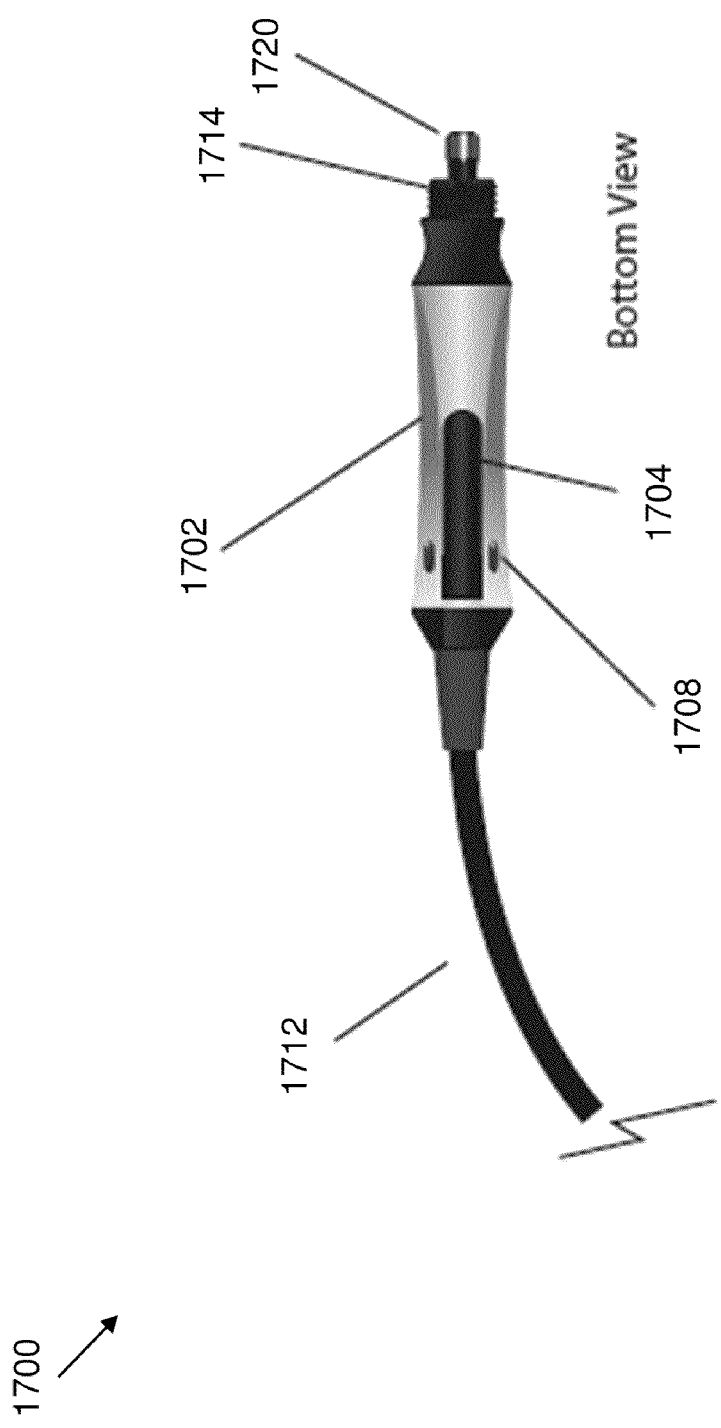

In embodiments, referring to FIGS. 17A, 17B, and 17C, different views of a straight handle 1700 for use with the rotary-oscillating tool 100 as described above may be provided. As shown in a side view by FIG. 17A, the handle 1700 may include a body 1702. The body 1702 of the handle 1700 may be fabricated of plastic or metal without limitations. The body 1702 may act as a casing or a housing of the handle 1700. The handle 1700 may further include a trigger 1704 that may be engaged with a clutch system (not shown in the fig.) on a shaft of the oscillatory-rotary tool 100 to create a spinning motion at the tip of the handle 1700. The trigger 1704 may enable opening of airway into the handle 1700 from a power source such as a pneumatic power source to create spinning action at the tip of the handle 1700. An operating lock 1708 may be provided for the trigger 1704 to keep the trigger 1704 engaged in an on state or position.

Further, a working element lock 1710 to lock the rotary tool drive shaft fitted through the handle 1700 may be provided for securing the oscillating working elements 112. The oscillating working elements 112 may be of various types such as bits, diamond blades, band saw, resaw, head saw, chain saw blades, and the like.

The handle 1700 may be connected with a power source through a flex shaft 1712. In exemplary cases, the power source may include a rotary motor, a compressed air source, and the like without limitations. A few examples of the rotary motor-based power source may include without limitations a rotary motor by DREMEL, a rotary motor by ROTOZIP, a rotary motor by CRASFTSMAN, and the like. In accordance with various embodiments, motors, bodies, and shafts of rotary motor-based power sources may be of different sizes and performance levels. In an embodiment, the handle 1700 may be connected with the power source through a flex shaft 1712 from a rotary motor as may be utilized in the rotary motor industry. In an alternative embodiment, the handle 1700 may be connected with the power source through an air tube from a compressed air tank as may be utilized in the pneumatic air tool industry.

In embodiments, the motors, bodies, and shafts of the rotary motor-based power sources may be provided with attachments for enabling connections between various components through various attachment mechanisms. The attachment mechanisms may include quick release spring ball, buckle, threads, magnetic impact, and the like without limitations. In embodiments, the handle 1700 may be utilized to accommodate the attachments currently meant to be attached to the rotary motor to accomplish tasks such as conversion of rotary motion into oscillating motion or the attachments that may be utilized to guide a rotary motion such as in an ice skate sharpener, which holds a rotary sanding disk at a substantially 90 degrees to an ice skate blade. In embodiments, the power source may be a compressed air power source for the pneumatic air tool industry (as discussed above) that may power the handle 1700. In accordance with an embodiment, the handle 1700 may include the removable attachment facility 110 instead of several distinct cutting tools. The removable attachment facility 110 may support use of several different attachments such as bits, blades, saw, and the like that may be attached to the handle 1700 through various mechanisms and designs such as quick release mechanism, threaded joints, and the like. The provision of several attachments fitted on the single handle 1700 may facilitate a less expensive, more convenient, and time conserving procedure for performing operations in a shop with the use of the rotary-oscillating tool 100, including the handle 1700.

In an embodiment, the attachments may be fitted on the removable attachment facility 110 in a manner similar to the procedure of fitting the flex shaft 1712 to the rotary motor. In another embodiment, for the pneumatic air tool type based power sources, the attachments may be coupled through fasteners as described above without limitations. An exemplary fastening mechanism such as threaded joint 1714 is depicted in FIG. 17A provided at the end of the rotary tool drive shaft 1718. The end of the rotary tool drive shaft 1718 is responsible for driving the attachments such as the bits and the like.

Figure 18A:
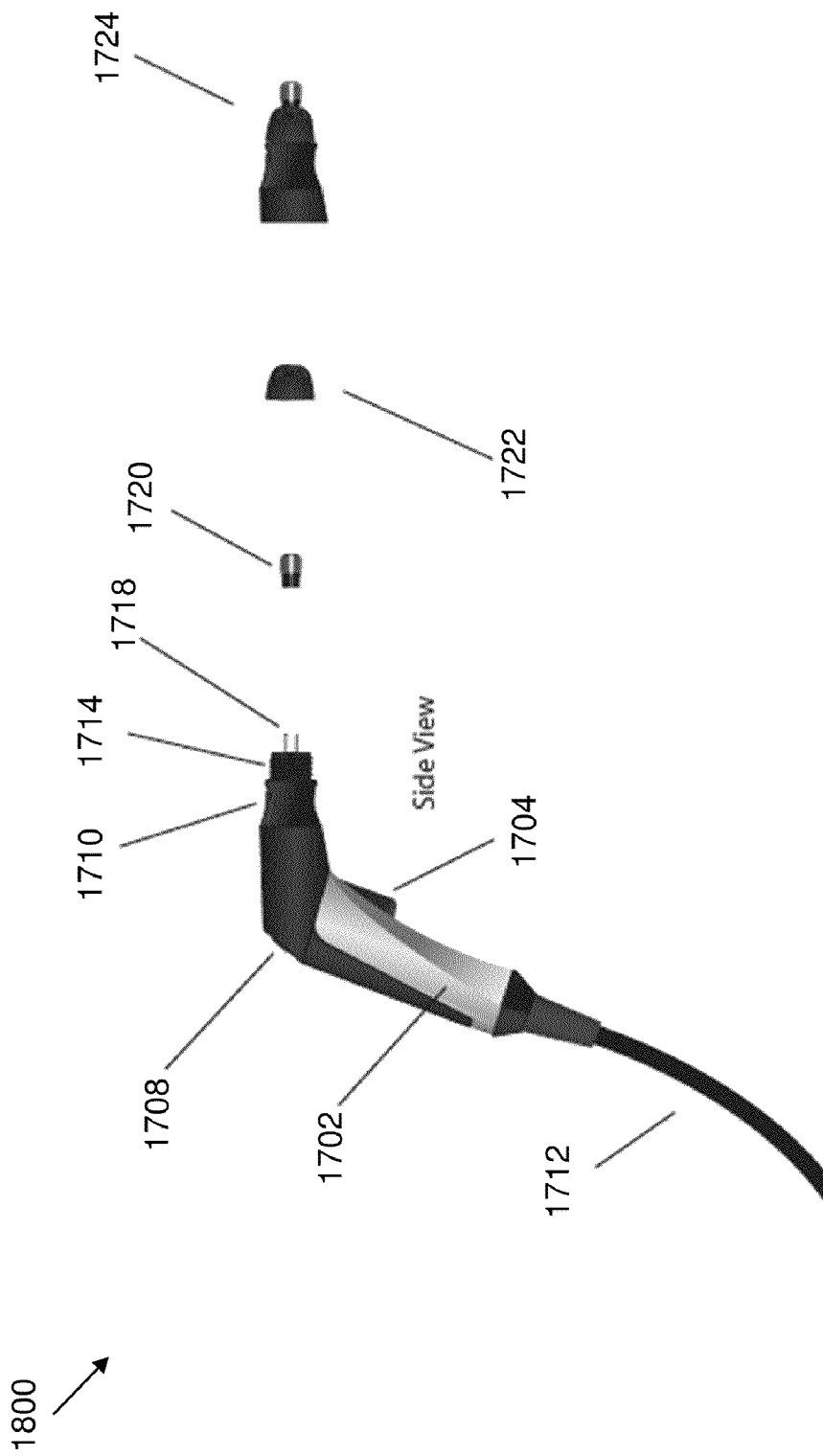
FIG. 18A and FIG. 18B depict different views of a pistol grip handle for use with the rotary-oscillating tool, in accordance with another embodiment of the present invention.
Figure 18B:
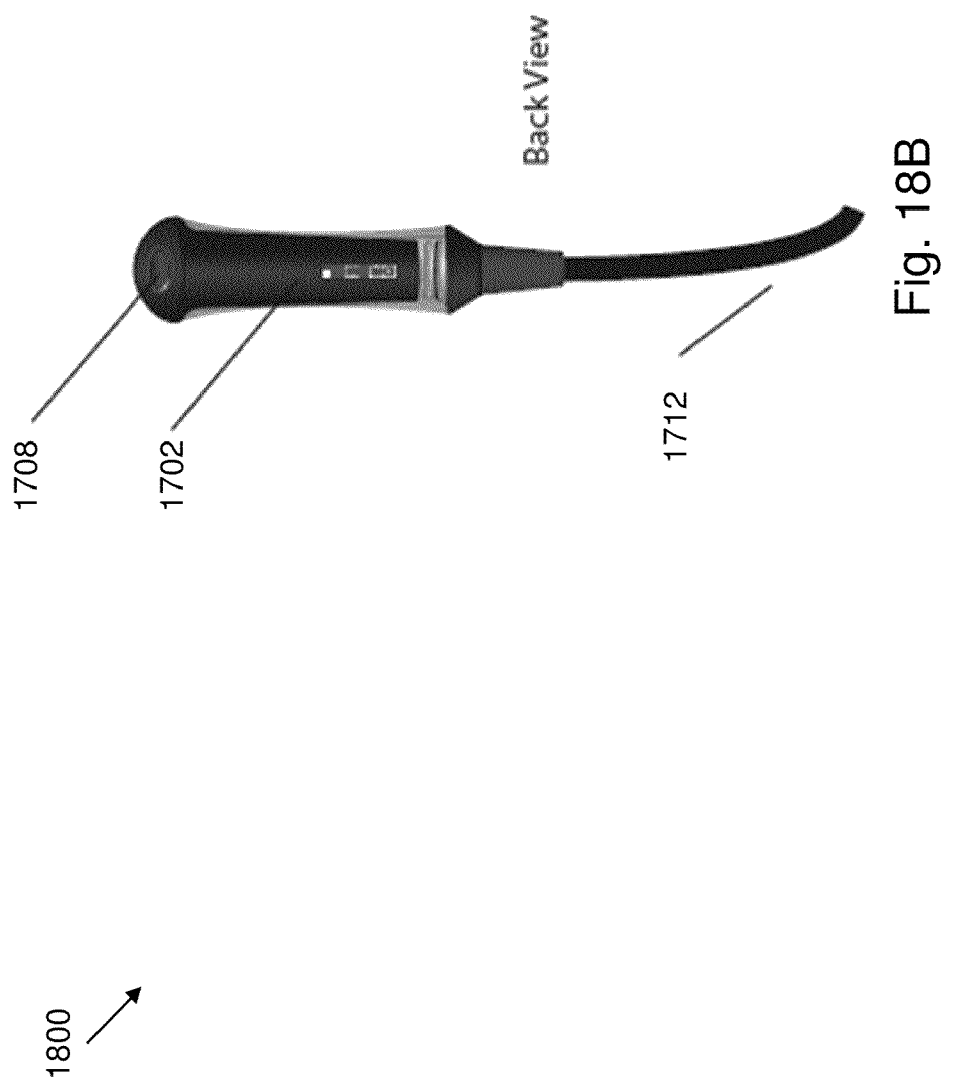

A threaded tip 1720 may be utilized to be attached at the end of the rotary tool drive shaft 1718 in combination with a collate for the purpose of securing a smaller shaft at the end of the rotary tool drive shaft 1718 for transferring rotary motion further. A cover 1722 may be provided to hide the attachments fitted on the threaded joints or any other attachment mechanism or coupling mode. The cover 1722 coupled at the end of the rotary tool drive shaft 1718 may be depicted by 1724 in assembled form in accordance with an embodiment of the present invention. FIGS. 17B and 17C may depict top view and the bottom view of the handle 1700, respectively, along with the attachment mechanism as described above in conjunction with FIG. 17A. In other embodiments, referring to FIGS. 18A and 18B, different views of a pistol grip handle 1800 for use with the rotary-oscillating tool 100 may be provided. As illustrated, the pistol grip handle 1800 may include the handle body 1702, the trigger 1704, the lock 1708 for the trigger 1704, the lock 1710 to lock the rotary tool drive shaft, the flex shaft 1712 connecting the power source, the fastening mechanism such as the threaded joint 1714 for coupling the attachments provided at the end of the rotary tool drive shaft 1718, the threaded tip 1720, and the cover 1722 coupled at the end of the rotary tool drive shaft 1718. These elements have been described in conjunction with FIGS. 17A, 17B, and 17C in detail. The cover 1722 coupled at the end of the rotary tool drive shaft 1718 may be depicted by 1724 in assembled form in accordance with an embodiment of the pistol grip handle 1800. FIG. 18B may depict rear view of the pistol grip handle 1800 along with the attachment mechanism as described above in conjunction with FIG. 18A.

Figures 19A, 19B:
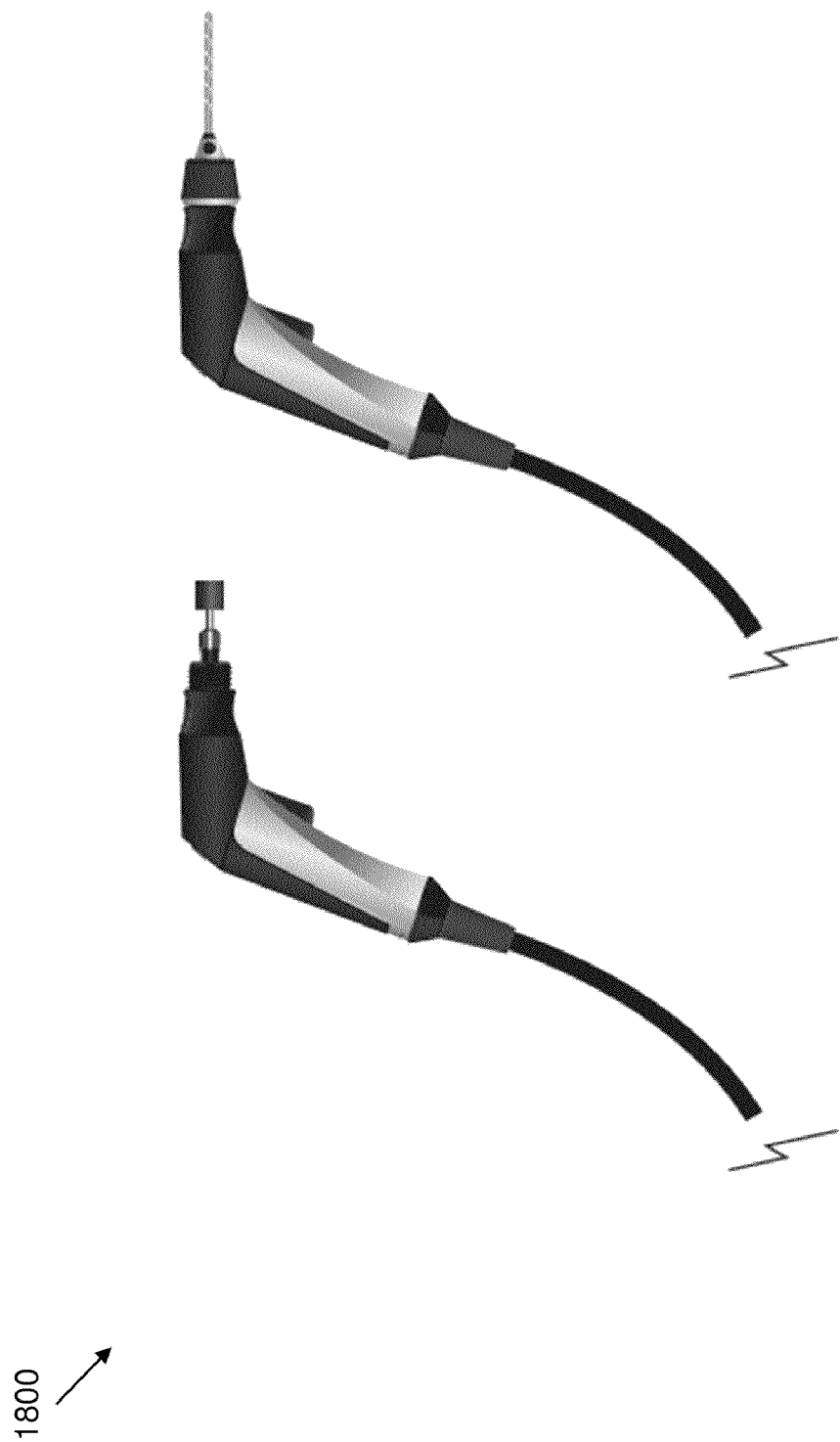
FIG. 19A and FIG. 19B depict the pistol grip handle with attachments, in accordance with various embodiments of the present invention.

FIG. 19A may illustrate the pistol grip handle 1800 with a sanding bit attached to the end of the rotary tool drive shaft 1718 without the cover 1722. FIG. 19B may illustrate the pistol grip handle 1800 with an attachment coupled to the fastening mechanism such as the threaded joint 1714. It may be appreciated that the fastening mechanism may be of any other type such as a buckle joint, quick release mechanism, magnetic impact based joint, and the like without limitations. As illustrated, the attachment is a drill bit holder capable of receiving drill bits of varying sizes for performing drilling operations actuated by the rotary motion of the rotary tool drive shaft.

Figure 19C:
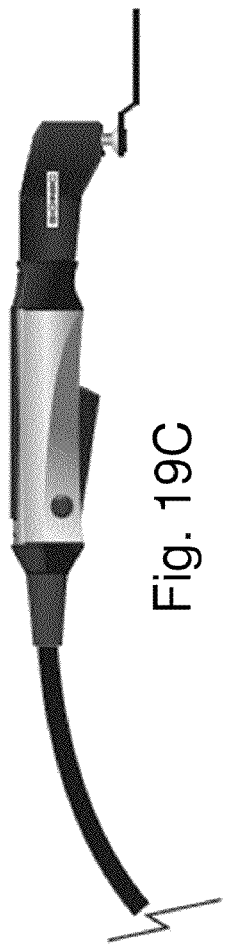
FIG. 19C, FIG. 19D, and FIG. 19E depict the straight handle with attachments, in accordance with various embodiments of the present invention.
Figure 19D:
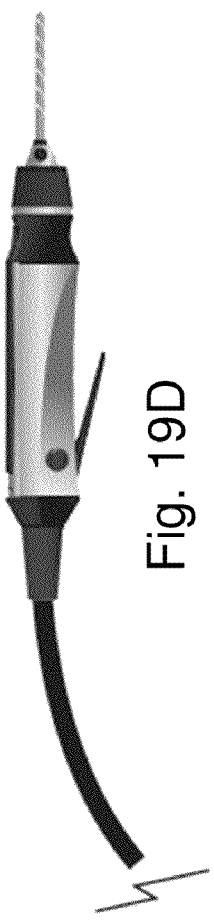
Figure 19E:
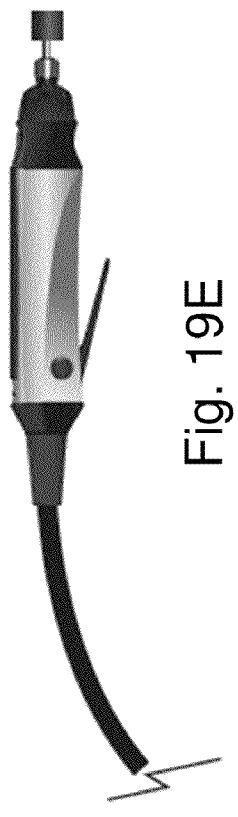
Figure 19F:
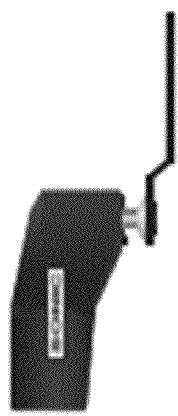
FIG. 19F, FIG. 19G, and FIG. 19H depict exploded views of the attachments as depicted in FIG. 19C, FIG. 19D, and FIG. 19E, respectively, in accordance with various embodiments of the present invention.
Figure 19G:
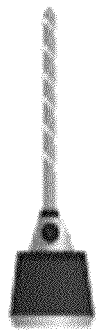
Figure 19H:

FIGS. 19C, 19D, and 19E may illustrate exemplary straight handles such as the straight handle 1700 with various attachments attached thereto. The attachment may be a saw as illustrated in FIG. 19C. The attachment may be a drill bit as illustrated in FIG. 19D. The attachment may be a drill bit of a different type as illustrated in FIG. 19E. FIGS. 19F, 19G, and 19H may illustrate exploded views of the attachments as depicted in FIGS. 19C, 19D, and 19E, respectively, prior to being coupled with the rotary-oscillating tool 100. It may be appreciated by a person ordinarily skilled in the art that various types of attachments other than those illustrated here may be utilized without limiting the spirit and scope of the present invention.

Figure 20A:
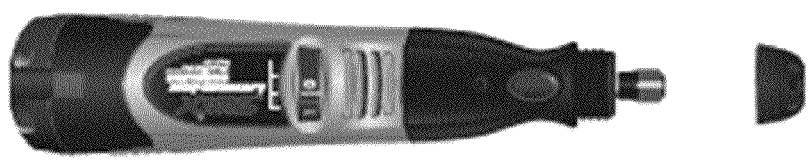
FIG. 20A depicts the rotary-oscillating tool powered by a rotary motor, in accordance with various embodiments of the present invention.

FIG. 20A may illustrate the rotary-oscillating tool 100 powered by a rotary motor in accordance with an exemplary embodiment of the present invention. The rotary motor may be of various types as illustrated above without limiting the spirit and scope of the present invention. In accordance with alternative embodiments, the rotary-oscillating tool handle 1700 may be powered by a compressed air tank in a pneumatic power source-based rotary-oscillating tool 100. The attachment method of the rotary motor may be similar to the attachment method of the handle 1700 while the connection or coupling type may be similar or distinct as mentioned above.

FIGS. 20B, 20C, and 20D may illustrate side view, top view, and the bottom view of the rotary-oscillating tool 100, respectively, powered by the rotary motor. The rotary motor may be coupled with the rotary-oscillating tool 100 through the flexshaft 1712 that may form a connection with the rotary motor through a shaft connector 2002. The attachment attached with the rotary-oscillating tool 100 may be the saw as depicted in FIG. 20B, a wood blade as depicted in FIG. 20C, and the like without limitations.

FIG. 20E may illustrate side view of the rotary-oscillating tool 100 powered by the rotary motor with a scissor attachment 2004, in accordance with an embodiment of the present invention. The scissor attachment 2004 with the rotary motor may facilitate as an electric scissor capable of cutting rapidly through a variety of materials. The scissor attachment 2004 may find applications in cutting, fabrication, machining, or other similar manufacturing processes without limitations. The scissor attachment 2004 may convert the rotary-oscillating tool 100 into a scissor type machining/cutting device that may generate rapid cutting movements between an upper blade 2008 and a lower blade 2010 by moving the upper blade 2008 or the lower blade 2010 or both up and down. The scissor attachment 2004 may be attached to the rotary-oscillating tool 100 in several ways and through several mechanisms as described earlier with reference to other attachments.

The cutting/machining action may be performed by the scissor attachment 2004 by stabilizing the lower blade 2010 to the attachment body. Subsequently, the upper blade 2008 may be moved up and down on engaging itself to the lower blade 2010 with the use of a pivot point provided on the upper blade 2008 capable of creating a rotational degree of freedom. The up and down motion may be drawn from the rotary tool drive shaft that may be provided with an off-centric or eccentric pin or ball bearing or the like element on the tip portion of the rotary tool drive shaft. The off-centric placement may allow hitting of the upper blade 2008 periodically for up and down movements. Further, the off centric placement of the pin or ball bearing or the like element on the tip portion of the rotary tool drive shaft may generate a closing power from the motor. This may result in the up and down cutting or shearing or other machining movements between the upper blade 2008 and the lower blade 2010. Additionally, the upper blade 2008 may contain a spring type of arrangement for disengaging the upper blade 2008 from the lower blade 2010 that may pull the upper blade 2008 back. The upper blade 2008 and the lower blade 2010 may be interchangeable and may be replaced after being worn out. Further, the scissor attachment 2004 may be removed to be changed with a different attachment for operating on other jobs or materials to be machined.

As described above, the present invention may combine the handle 1700 or 1800 to the power source such as the compressed air or the rotary motor through the flexshaft 1712. Therefore, the invention may allow a user to operate with the rotary-oscillating tool 100 in both the pneumatic air tool industry and rotary motor industry without limitations. Further, the invention may facilitate use of a single handle 1700 or 1800 with multiple attachments to save money, time and space, and the like. For example, it may facilitate using the rotary-oscillating tool 100 in an area that is too small for the full tool 100 (e.g. to fit inside a ski boot). Further, the user may also control on or off operation from the handle 1700 or 1800 itself and not from the motor. In addition, multiple and varying attachments may be utilized to vary the purpose of the rotary-oscillating tool 100.

Figure 21:
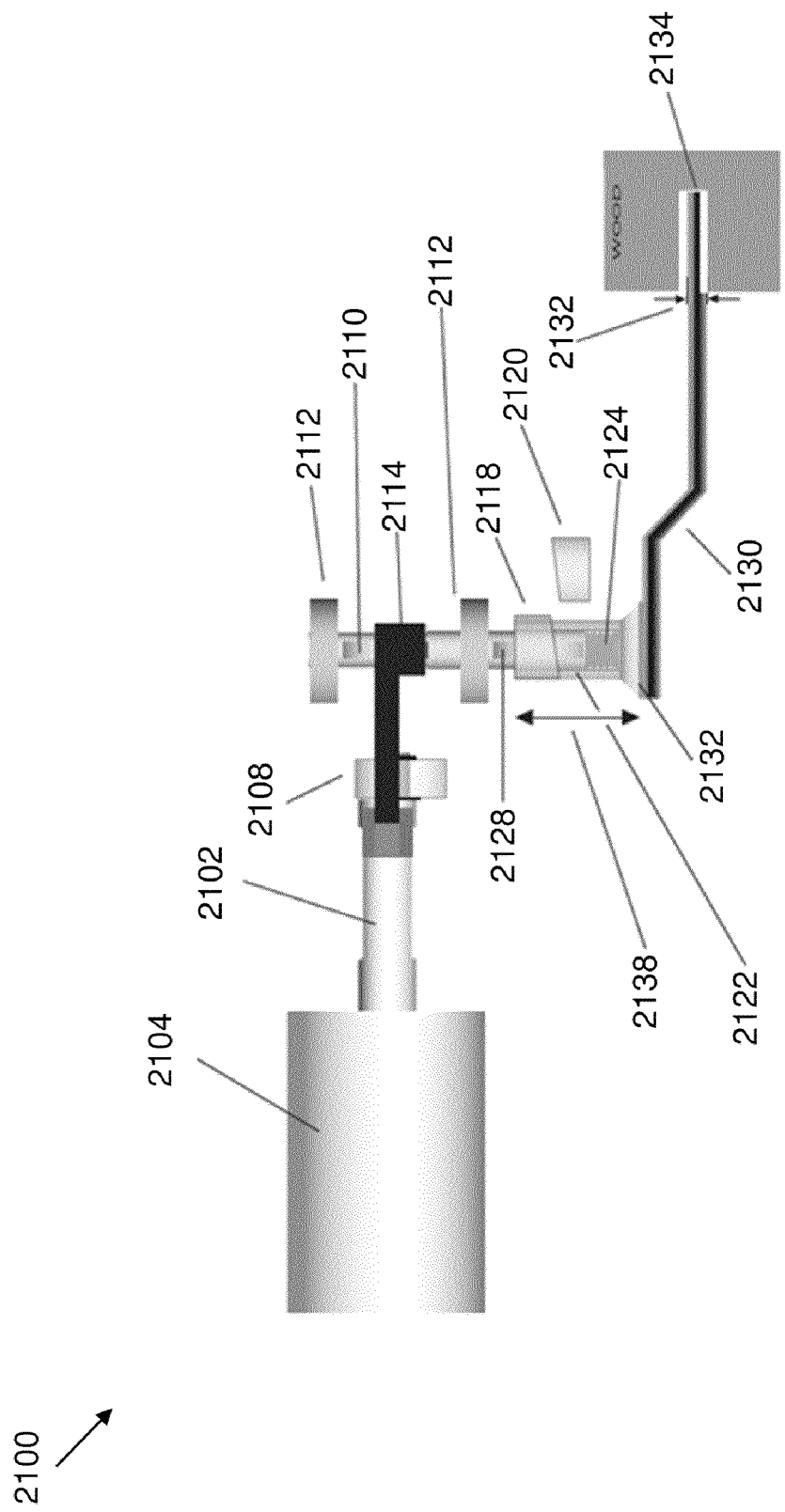
FIG. 21 depicts a side view of a system for providing a rotary-oscillating tool or adapter with multi-directional oscillating capability, in accordance with an embodiment of the present invention.

FIG. 21 depicts a side view of a multi-directional oscillating system 2100 for providing a rotary-oscillating tool or adapter with multi-directional oscillating capabilities, in accordance with an embodiment of the present invention. The multi-directional oscillating system 2100 may hereafter be referred as an oscillating system 2100 merely for the simplicity of the description without limiting the spirit and scope of the present invention. The oscillating system 2100 may include a motor shaft 2102 connecting the oscillating system 2100 with a power source 2104, an off-centric ball bearing 2108 mounted on the motor shaft 2102, a vertical shaft 2110, a vertical shaft ball bearing 2112, a cam 2114, a first element with a tapering surface at one end referred to as a first ramp 2118 detachably connected with a second element having a tapering surface at one end referred to as a second ramp 2120, a linear bearing 2122, a spring 2124, a groove 2128 in the vertical shaft 2110, a blade 2130, and a blade mount 2132. Alternatively, the power source 2104 and motor shaft 2102 may be provided by an off-the shelf rotary tool and the remainder of the system elements may be included in a rotary-oscillating tool adapter housing and other features as depicted in co-owned U.S. application Ser. No. 12/884,104.

The oscillating system 2100 as depicted in FIG. 21 may generate an oscillating motion in a side-to-side manner similar to the oscillating movements in a FEIN OSCILLATING TOOL (TRADEMARK) rotary-oscillating tool or a DREMEL MULTIMAX (TRADEMARK) rotary-oscillating tool, in accordance with an embodiment of the present invention. In another embodiment of the present invention, the oscillating system 2100 may generate an up-down motion in a seesaw manner. In yet another embodiment of the present invention, the oscillating system 2100 may generate a combination of both the side-to-side and the seesaw types of motions.

The oscillating system 2100 may be activated by a simple switch, knob, press button, dial, any electronic switch, and the like that may result in the flow of power from the power source 2104 to the oscillating system 2100 through the motor shaft 2102, thereby developing a rotational motion in the motor shaft 2102. In accordance with various embodiments of the present invention, the rotational motion of the motor shaft 2102 may drive the vertical shaft 2110 that may be indirectly coupled with the motor shaft 2102 through the off-centric ball bearing 2108 and the cam 2114. The off-centric nature of the off-centric ball bearing 2108 may be responsible for generating a periodic motion that may be reduced to a desired movement at the vertical shaft 2110 with the help of a profile of the cam 2114 designed accordingly. Other types of rotary-oscillating drive mechanisms are described in at least co-owned U.S. Ser. No. 12/884,104 and are included herein along with the entire disclosure thereof.

The reciprocating/oscillatory movement of the vertical shaft 2110 may force a ramp 2118 of the linear bearing 2122 to interact with a ramp 2120 resulting in the linear bearing 2122 traveling along a linear path aligned with the shaft 2110. A spring 2124 may assist in the linear bearing 2122 travel thereby resulting in a periodic up-down motion of the linear bearing 2122. The spring 2124 may help in stabilizing and providing the linear bearing 2122 a return to a normal position after being forced by the first ramp 2118 interacting with the second ramp 2120. In accordance with alternative embodiments, other mechanical linkages capable of creating a back pushing force to push the linear bearing 2122 upward may be utilized. The linear bearing 2122 may be permanently coupled with the first ramp 2118 and detachably coupled with the second ramp 2120. The first ramp 2118 may facilitate up and down movement when coupled with the second ramp 2120 to allow the linear bearing 2122 to slide along a linear direction with the use of a switch or a similar kind of operational interface. The sliding up and down movement may be ceased by moving the second ramp 2120 out from a coupled position with ramp 2118 as indicated in FIG. 21. The ramp 2120 may be moved via a spring loaded actuator that causes the ramp 2120 to engage ramp 2118 when placed in a first actuator position and to disengage ramp 2118 when placed in a second actuator position. Further, the groove 2128 provided in the vertical shaft 2110 may allow lining up of the linear bearing 2122 to a desired position on the vertical shaft 2110 and for transferring the oscillating motion of the shaft 2110 to the linear bearing 2122 with still allowing the sliding movement of the linear bearing 2122. In alternative embodiments, a cut-off section of any other type such as a square cut-off section, a rectangular cut-off section, and the like may be utilized.

The blade 2130 may be coupled to the sliding linear bearing 2122 through the blade mount 2132 resulting in an oscillation of the blade 2132 for cutting or machining an item. As depicted, the blade 2130 may create a gap in the item being worked that is big enough to sufficiently allow debris and dust out of the machined portions. This may provide a clear hole or cut for the blade to efficiently cut the item.

Figure 22B:
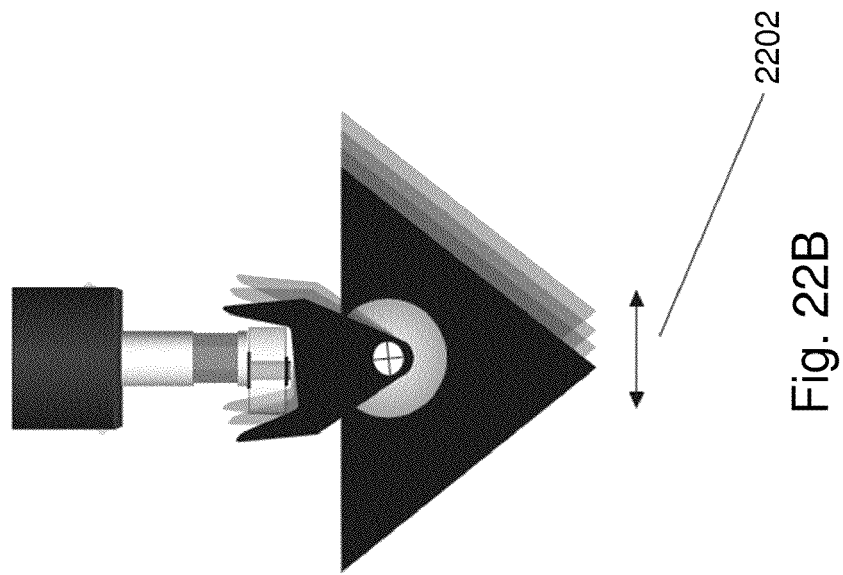
FIGS. 22A and 22B depict top views of working elements attached to a rotary-oscillating tool to which multi-directional oscillating may be provided, in accordance with an embodiment of the present invention.
Figure 22A:
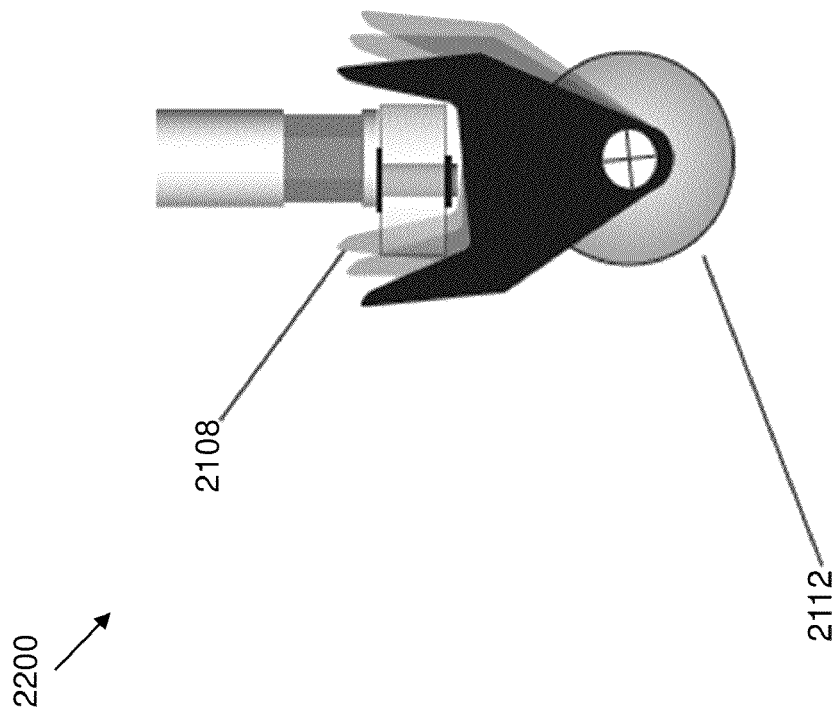

FIGS. 22A and 22B depict top views of the multi-directional oscillating system 2100, in accordance with an embodiment of the present invention. The arrow 2202 indicates the sidewise direction of the movement of the blade 2132 for machining materials.

FIG. 23 depicts a side view of an alternate embodiment of an oscillating system 2300, in accordance with another embodiment of the present invention. In accordance with this embodiment, the oscillating system 2300 may include a motor shaft 2102 connecting the oscillating system 2100 with a power source 2104, an off-centric ball bearing 2108 mounted on the motor shaft 2102, a vertical shaft 2110, a vertical shaft ball bearing 2112, a cam 2114, a pivot 2302 supporting a pivoted linkage 2304, a blade 2130, and a blade mount 2132. The vertical shaft 2110 may be driven in a manner similar to the procedure described in conjunction with the embodiment of the oscillating system 2100 in FIG. 21. Subsequently, the vertical shaft 2110 powers the pivoted linkage 2304 through the pivot 2302. The pivoted linkage 2302 may produce an up and down seesaw type of motion about the pivot point 2304. In accordance with various embodiments of the present invention, the pivot 2304 may be located on the vertical shaft 2110 such that its placement on the vertical shaft 2110 may define the nature of the oscillating movement at the tip of the blade 2130. This may allow movement of the whole blade 2130 or a portion of the blade 2130 in an oscillating manner.

Various other modes and mechanisms of transferring motion from the power source 2104 to the blade 2130 other than those described in the two embodiments here may be utilized to facilitate multi-directional oscillation. For example, gear arrangements, piston arrangements, cam-follower-based linkages, oscillating plates, crank-slider linkages, or a combination of several rigid links connected with joints or pivots, and the like may be utilized for generating the oscillating motion without limiting the spirit and scope of the present invention. The present invention may be utilized in machining and/or cutting surfaces of the materials such as wood, metals, fabrics, stones, and the like without limitations.

The present invention may provide several advantages such as those listed below.

An advantage of the present invention is to provide a multi directional oscillating system that may be utilized to perform machining through movements in multiple directions such as sidewise manner, up and down manner, and the like.

Another advantage of the present invention is to increase speed of the machining process, especially on hard materials. The up and down motion combined with the normal side-to-side motion of the blade may cut into the materials with a bigger slice formed at the region being machined by the blade.

Still another advantage of the present invention is that the multi directional oscillating motion of the blade may create more room for the machined dust and debris to escape from the region being machined, thereby preventing clogging of the blade teeth or tip. This may consequently enhance speed of machining and simultaneously increase the rate of cooling of the blade.

Yet another advantage of the present invention is that the multi directional oscillating system may be easily combined with the existing rotary-oscillating and/or rotary tools such as the those mentioned herein and elsewhere, and the like, thereby reducing the extra costs for development and manufacturing. Further, the multi directional oscillating system as disclosed by the present invention may be utilized in the compressed air tool-based industry as well as rotary motor-based industry as embodied in an attachment to the rotary tool or the compressed air tool or through a handle to create a unique and customized oscillating motion in multiple directions. Embodiments of rotary-oscillating handles and adapters that may utilize the multi-directional oscillating capabilities described herein are further described at least in U.S. Ser. No. 12/884,104.

The present invention may find application in several fields and may provide several other advantages without limiting the spirit and scope of the present invention. All documents mentioned herein are hereby incorporated in their entirety by reference.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method of multi-directional oscillation from a rotational source, comprising:
   receiving a rotational motion from a rotary tool element;
   converting the rotational motion to a first oscillating motion about an axis;
   converting the first oscillating motion to a second oscillating motion axially along the axis, wherein converting the first oscillating motion to the second oscillating motion is accomplished by moving a working element coupling along a longitudinal axis of a shaft, the shaft transferring the first oscillating motion about its longitudinal axis to the working element coupling, the working element coupling being moved by an interaction of a first ramp of the working element coupling and a second ramp, the second ramp disposed to interact with the first ramp first oscillating motion to cause the second oscillating motion; and
   facilitating application of at least one of the first oscillating motion and the second oscillating motion to a working element.

2. A rotary to multi-oscillating system, comprising:
   a first oscillating motion system for producing a first oscillating motion from a rotational source, comprising:
   an off-centric ball bearing receiving a rotational motion from the rotational source;
   a cam interacting with the off-centric ball bearing to cause a shaft to oscillate about its longitudinal axis; and
   a second oscillating motion system for producing a second oscillating motion from the first oscillating motion of the shaft, comprising:
   a linear bearing with a first ramp, the linear bearing receiving the first oscillating motion from the shaft and disposed to move along the shaft; and
   a multi-oscillation generating ramp disposed relative to the first ramp so that the first oscillating motion of the linear bearing cause the first ramp to interact with the multi-oscillating ramp resulting in the linear bearing moving along the shaft in a second oscillating motion.

3. The system of claim 2, further including a spring disposed within the linear bearing to facilitate the linear bearing stably moving along the shaft in the second oscillating motion.

4. The system of claim 2, further including a working element attached to the linear bearing for receiving the first oscillating motion and the second oscillating motion.

* * * * *